United States Patent
Krantz et al.

(10) Patent No.: US 9,778,368 B2
(45) Date of Patent: Oct. 3, 2017

(54) SATELLITE NAVIGATION USING SIDE BY SIDE ANTENNAS

(71) Applicant: Trimble Inc., Sunnyvale, CA (US)

(72) Inventors: Eric Charles Krantz, Emerald Hills, CA (US); Peter Van Wyck Loomis, Sunnyvale, CA (US); Gregory Craig Wallace, Arvada, CO (US); Nicholas Charles Talbot, Ashburton (NZ)

(73) Assignee: Trimble Inc., Sunnyvale, CA (US)

( * ) Notice: Subject to any disclaimer, the term of this patent is extended or adjusted under 35 U.S.C. 154(b) by 440 days.

(21) Appl. No.: 14/479,370

(22) Filed: Sep. 7, 2014

(65) Prior Publication Data

US 2016/0070001 A1    Mar. 10, 2016

(51) Int. Cl.
| | |
|---|---|
| *G01S 19/32* | (2010.01) |
| *G01S 19/36* | (2010.01) |
| *H01Q 1/32* | (2006.01) |
| *H01Q 21/30* | (2006.01) |
| *H01Q 1/36* | (2006.01) |
| *H01Q 9/28* | (2006.01) |
| *H01Q 9/42* | (2006.01) |

(52) U.S. Cl.
CPC .............. *G01S 19/32* (2013.01); *G01S 19/36* (2013.01); *H01Q 1/3275* (2013.01); *H01Q 1/362* (2013.01); *H01Q 9/28* (2013.01); *H01Q 9/42* (2013.01); *H01Q 21/30* (2013.01)

(58) Field of Classification Search
CPC ....... G01S 19/32; G01S 19/36; H01Q 1/3275; H01Q 1/362; H01Q 9/28; H01Q 9/42; H01Q 21/30

USPC .................................................... 342/357.72
See application file for complete search history.

(56) References Cited

U.S. PATENT DOCUMENTS

| | | |
|---|---|---|
| 6,421,024 B1 | 7/2002 | Stolle |
| 6,509,815 B1 | 1/2003 | Stolle |
| 6,985,121 B1 | 1/2006 | Bogdans et al. |
| 7,053,850 B1 | 5/2006 | Bogdans et al. |
| 7,053,851 B1 | 5/2006 | Bogdans et al. |
| 7,149,489 B2 | 12/2006 | Hong |
| 7,164,389 B1 | 1/2007 | Platt |
| 7,180,460 B1 | 2/2007 | Bogdans et al. |
| 7,239,286 B1 | 7/2007 | Miller et al. |
| 7,400,303 B1 | 7/2008 | Miller |
| 7,512,388 B2 | 3/2009 | Snider |

(Continued)

OTHER PUBLICATIONS

International Search Report of the International Searching Authority for PCT Application No. PCT/US2015/047586, dated Feb. 3, 2016, 6 pages.

(Continued)

*Primary Examiner* — Frank J McGue
(74) *Attorney, Agent, or Firm* — Kilpatrick Townsend & Stockton LLP

(57) ABSTRACT

A multiband antenna apparatus for high-precision GNSS positioning is proposed. The multiband antenna apparatus comprises a first antenna configured for reception of GNSS signals in a first multiband of electromagnetic spectrum, a second multiband antenna configured for reception of GNSS signals in a second multiband of electromagnetic spectrum, and an antenna phase reference point configured to represent an integrated electric phase data. The antenna phase reference point is related to a physical reference point of the antenna apparatus.

23 Claims, 7 Drawing Sheets

A multiband antenna apparatus for high-precision GNSS Positioning

(56) References Cited

U.S. PATENT DOCUMENTS

| | | |
|---|---|---|
| 7,683,830 B2 | 3/2010 | Montgomery et al. |
| 7,791,545 B2 | 9/2010 | Lin et al. |
| 8,698,673 B2 | 4/2014 | Wong et al. |
| 2005/0190106 A1 | 9/2005 | Anguera Pros et al. |
| 2005/0242990 A1 | 11/2005 | Lawrence et al. |
| 2010/0045522 A1 | 2/2010 | Montgomery et al. |
| 2011/0090114 A1 | 4/2011 | Fenton |
| 2015/0325928 A1* | 11/2015 | Chao ................. H01Q 21/26 |
| | | 343/727 |

OTHER PUBLICATIONS

Written Opinion of the International Searching Authority for PCT Application No. PCT/US2015/047586, dated Feb. 3, 2016, 7 pages.
Detratti, M., et al., "Dual-Band RF Front-End Solution for Hybrid Galileo/GPS Mass Market Receivers," Consumer Communications and Networking Conference, 2008, CCNC, 2008; $5^{th}$ IEEE, IEEE CCP, Piscataway, NJ, USA, Jan. 1, 2008, pp. 603-607.

* cited by examiner

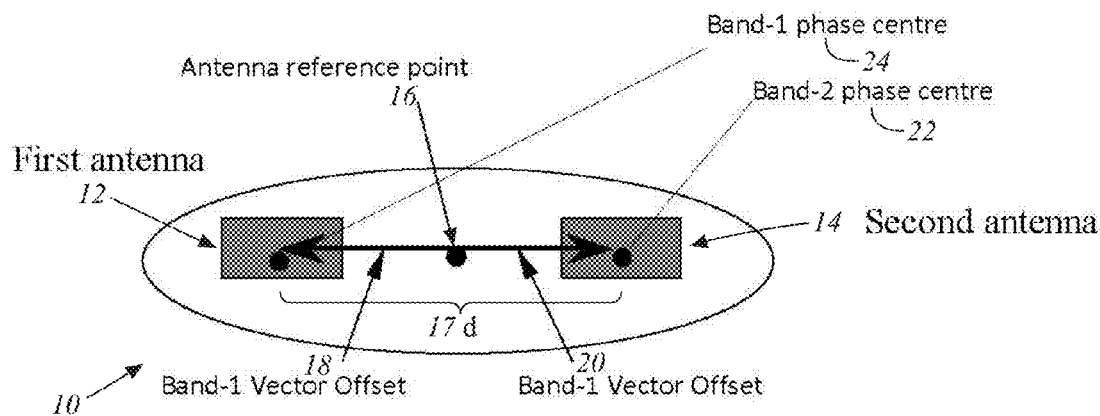
FIG. 1 A multiband antenna apparatus for high-precision GNSS Positioning
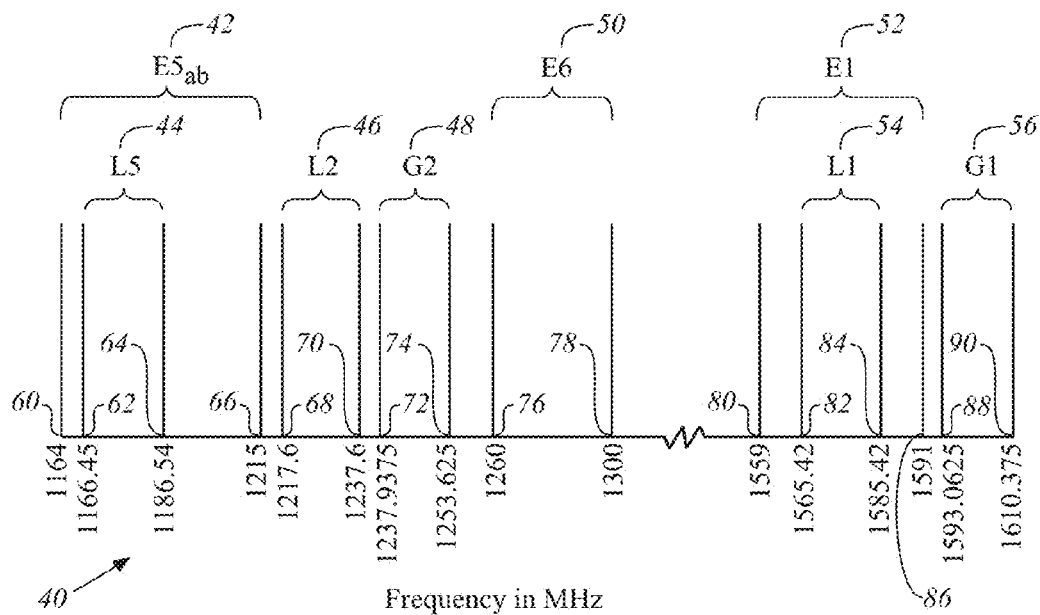
FIG. 2 Parts of the electromagnetic spectrum covered by different GNSS systems

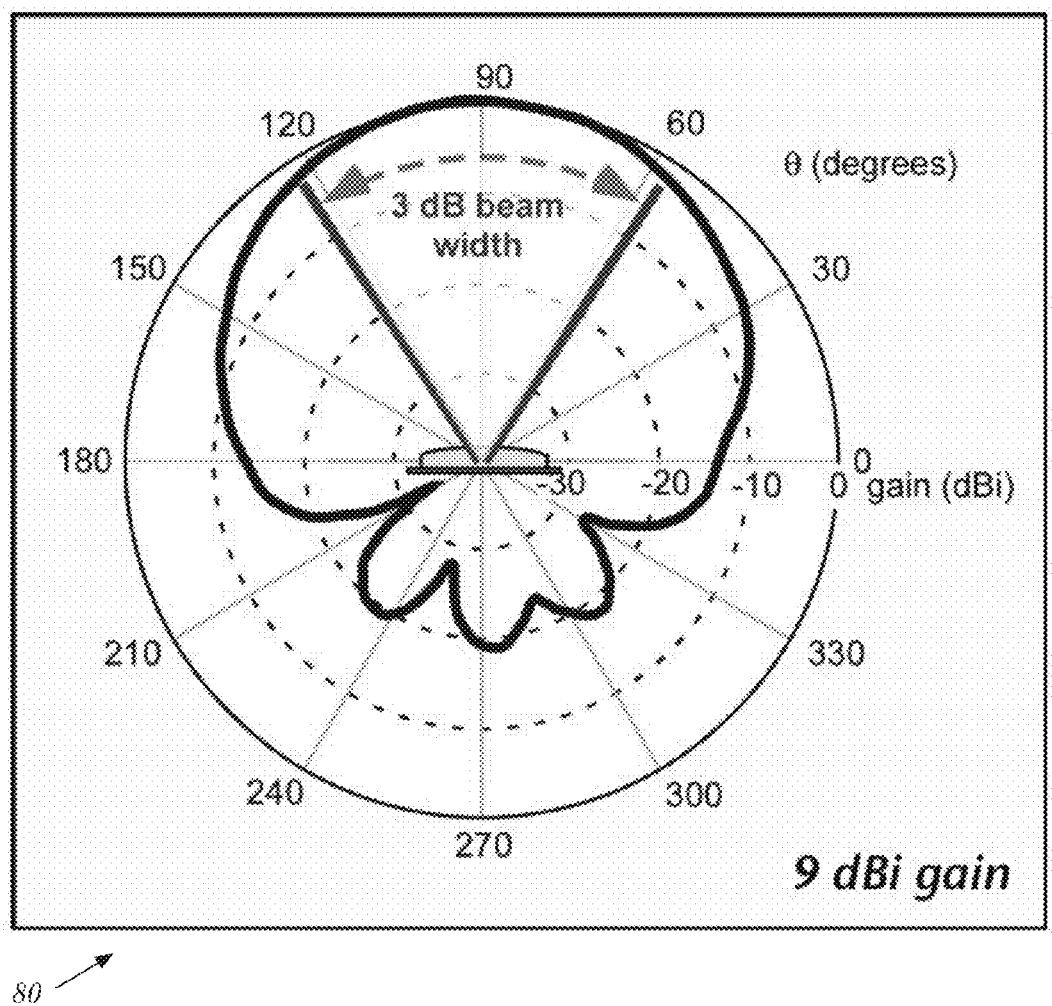
FIG. 3 Typical radiation pattern for a linealy-polarized 900-MHz patch antenna

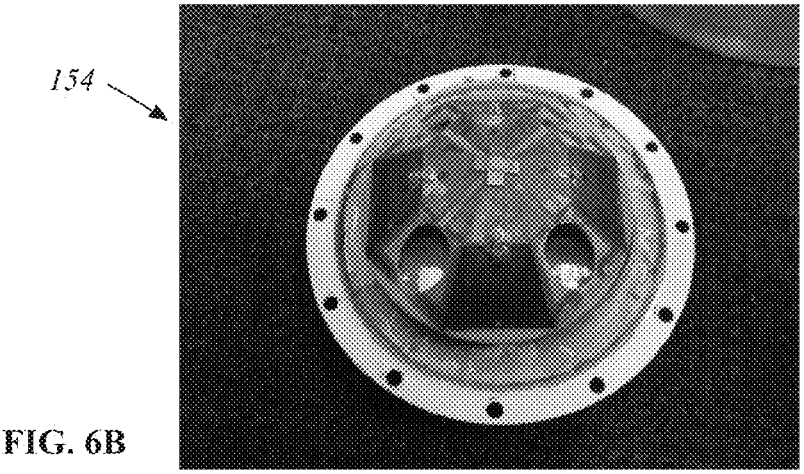
FIG. 6B
FIG. 6C
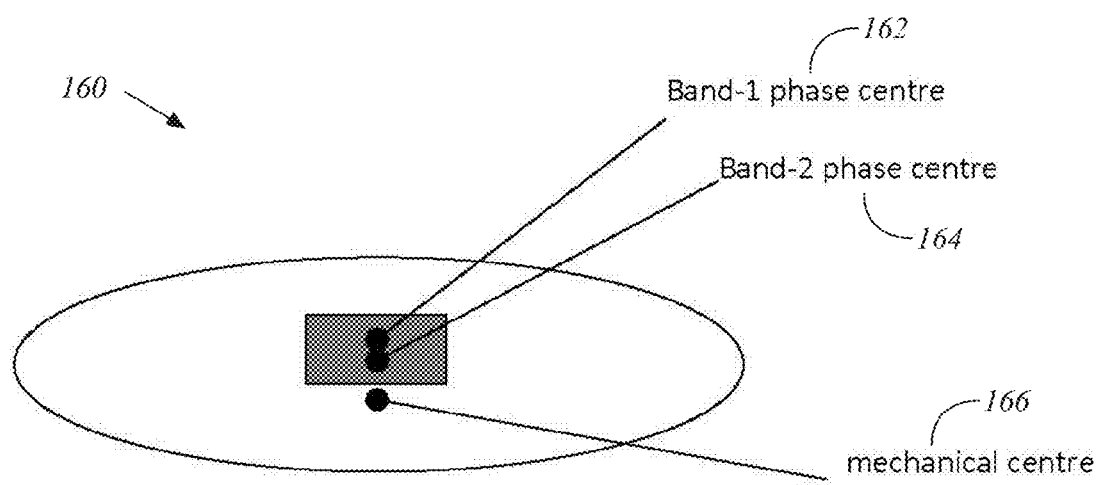
FIG. 7 Relationship between antenna phase centers and mechanical center of a patch antenna.

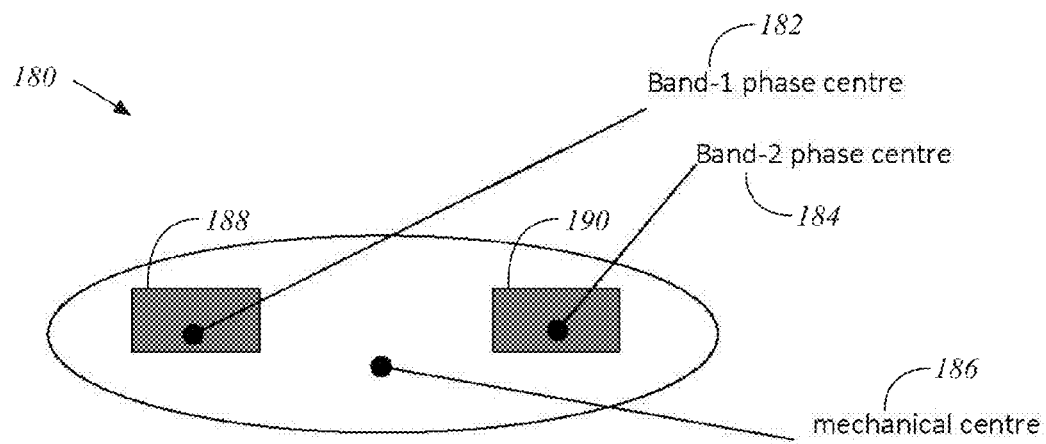
FIG. 8 Horizontally separated multi-band antenna system
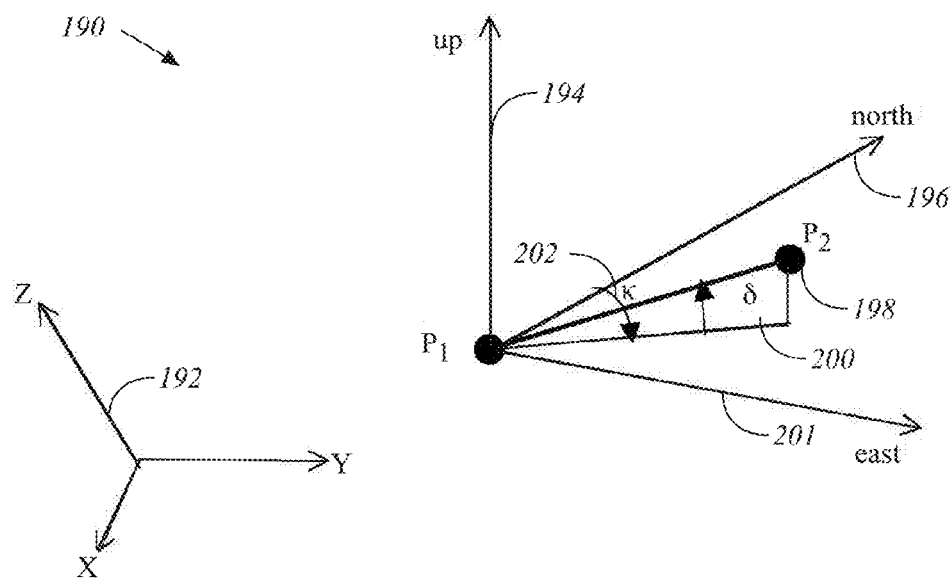
FIG. 9 Coordinate geometry for antenna tilt and heading in e, n, u and X, Y, Z frames.

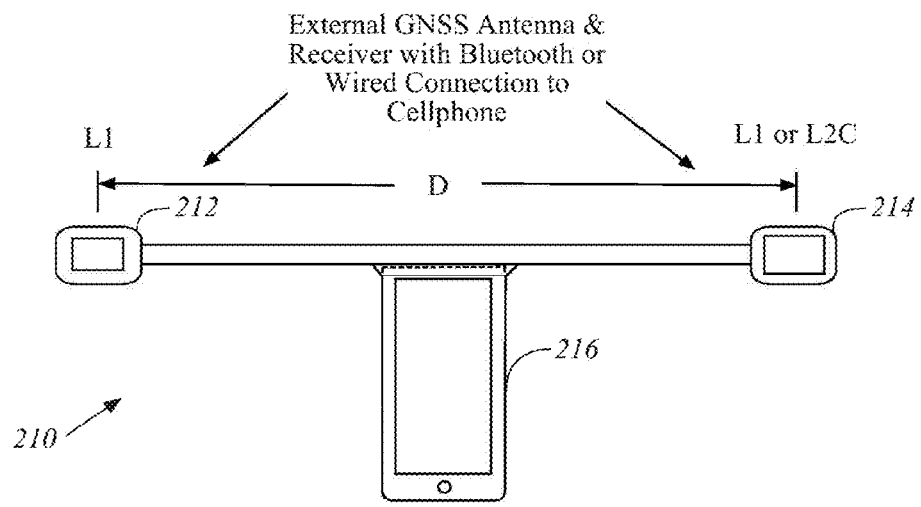
FIG. 10A
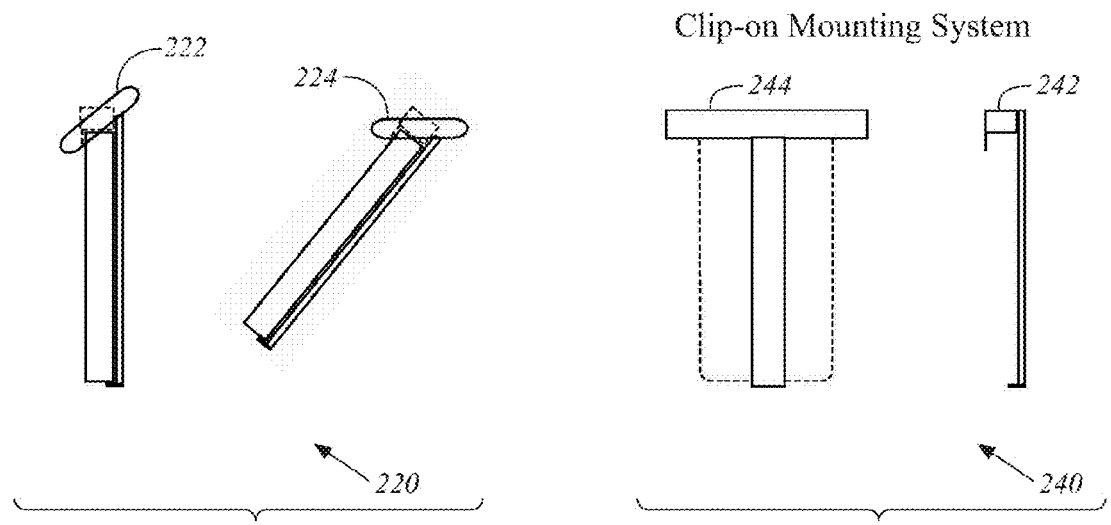
FIG. 10B
FIG. 10C

SATELLITE NAVIGATION USING SIDE BY SIDE ANTENNAS

TECHNICAL FIELD

The technology relates to the field of satellite navigation, and more specifically to the field of using multiband antennas for satellite navigation.

BACKGROUND

Some of the Global Navigation Satellite System (GMSS) antennas in the market today rely on a technology called a patch antenna. This antenna is structured as a metal "patch" of some shape (rectangular, square, circle, triangle) located above a ground plane with a dielectric material in between the metal parts.

The patch is generically sized to about half a wavelength (dielectric compensated) at the center frequency of desired band. These patches can be excited through a variety of feeding methods: micro strip, probe or aperture coupled, to name a few. Patch antennas are generally limited to 10-20% bandwidth.

Thus, to cover the entire Global Navigation Satellite System (GNSS) spectrum, from 1164 MHz and up to 1610 MHz, it is common to stack patches with different resonant frequencies. This offers the advantage of keeping the horizontal phase center (the virtual point in space that the GNSS system measures its range) between the different bands in the location. This allows the location being measured to be independent of the orientation of the antenna.

However, stacking the patches has the disadvantage of requiring more effort to manufacture as the feeds of the upper patch should pass thru the lower patch and the feeds for the lower patch should terminate below the upper patch.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A multiband antenna apparatus for high-precision GNSS positioning is proposed. The multiband antenna apparatus comprises a first antenna configured for reception of GNSS signals in a first multiband of electromagnetic spectrum. The first multiband antenna includes a first phase center configured to represent a first phase data collected by the first multiband antenna in the first multiband of electromagnetic spectrum.

The multiband antenna apparatus further comprises a second multiband antenna configured for reception of GNSS signals in a second multiband of electromagnetic spectrum. The second multiband antenna includes a second phase center configured to represent a second phase data collected by the second multiband antenna in the second multiband of electromagnetic spectrum. The first phase center of the first multiband antenna is separated from the second phase center of the second multiband antenna by a separation distance.

The multiband antenna apparatus further comprises an antenna phase reference point configured to represent an integrated electric phase data by integrating the first phase data collected by the first multiband antenna in the first multiband of electromagnetic spectrum and by integrating the second phase data collected by the second multiband antenna in the second multiband of electromagnetic spectrum. The antenna phase reference point is related to a physical reference point of the antenna apparatus.

DESCRIPTION OF THE DRAWINGS

The accompanying drawings, which are incorporated in and form a part of this specification, illustrate embodiments of the technology and, together with the description, serve to explain the principles below:

FIG. 1 illustrates a multiband antenna apparatus for high-precision GNSS positioning for the purposes of the present technology.

FIG. 2 shows parts of the electromagnetic spectrum covered by different GNSS.

FIG. 3 depicts a typical radiation pattern for a linearly-polarized 900-MHz patch antenna.

FIG. 6B shows a bowtie dipole antenna,

FIG. 6C depicts a droopy dipole antenna.

FIG. 7 illustrates a relationship between antenna phase centers and a mechanical center of a patch antenna.

FIG. 8 shows a horizontally separated multi-band antenna system for the purposes of the present technology.

FIG. 9 depicts coordinate geometry for antenna tilt and heading in (e, n, u), and (X, Y, Z) frames.

FIG. 10A is a front view of a multiband antenna apparatus for high-precision GNSS positioning used for smart phone applications for the purposes of the present technology.

FIG. 10B is a side view of a multiband antenna apparatus for high-precision GNSS positioning used for smart phone applications for the purposes of the present technology.

FIG. 10C is a clip-on mounting system for a multiband antenna apparatus for high-precision GNSS positioning used for smart phone applications for the purposes of the present technology.

DETAILED DESCRIPTION

Figure 4:
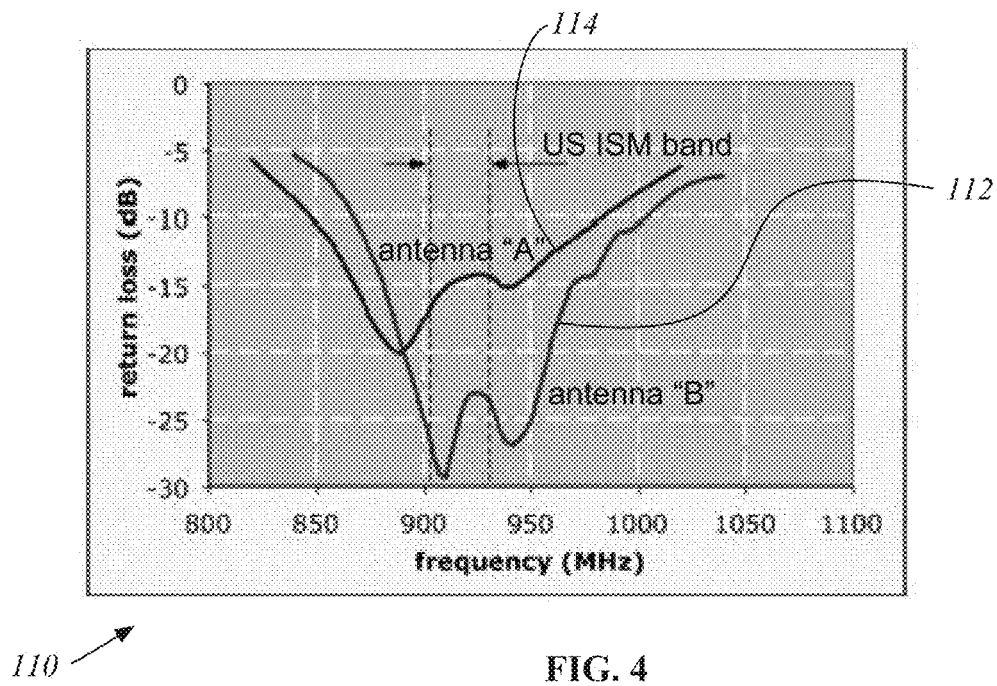
FIG. 4 illustrates the negative return loss for a pair of representative patch antennas; both antennas are nominally designed to operate in the US Industrial, Scientific, and Medical (ISM) band from 902 MHz-to 928 MHz.

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

In an embodiment of the present technology, FIG. 1 illustrates the multiband antenna apparatus 10 for high-precision GNSS positioning.

In an embodiment of the present technology, referring still to FIG. 1, the multiband antenna apparatus 10 for high-precision GNSS positioning comprises the first antenna 12 configured for reception of GNSS signals in a first multiband of electromagnetic spectrum, and the second antenna 14 configured for reception of GNSS signals in a second multiband of electromagnetic spectrum.

The primary motivation for the development of the multiband antenna apparatus 10 (of FIG. 1) (or the side-by-side antenna apparatus) came from a request for a low cost GNSS antenna for the automotive market. The typical low cost antennas on the market today provide only GPS L1 narrow-band (+/−2 MHz) signals or, at most, GPS and GLONASS L1 (1573-1602 MHz). For emerging automotive applications, the antennas will need to be capable of receiving multiple GNSS signals from a variety of satellite constellations in space.

In an embodiment of the present technology, FIG. 2 shows different parts of the electromagnetic spectrum 40 covered by the different GNSS systems.

The Global Positioning System (GPS) is a space-based satellite navigation system that provides location and time information in all weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver.

The GPS project was developed in 1973 to overcome the limitations of previous navigation systems, integrating ideas from several predecessors, including a number of classified engineering design studies from the 1960's. GPS was created and realized by the U.S. Department of Defence (DoD) and was originally run with 24 satellites. It became fully operational in 1995.

Advances in technology and new demands on the existing system have now led to efforts to modernize the GPS system and implement the next generation of GPS III satellites and Next Generation Operational Control System (OCX). Announcements from Vice President Al Gore and the White House in 1998 initiated these changes. In 2000, the U.S. Congress authorized the modernization effort, GPS III.

Galileo is a global navigation satellite system (GNSS) currently being built by the European Union (EU) and European Space Agency (ESA). The €5 billion project is named after the Italian astronomer Galileo Galilei. One of the aims of Galileo is to provide a high-precision positioning system upon which European nations can rely, independently from the Russian GLONASS, US GPS, and Chinese Compass systems (see below), which can be disabled in times of war or conflict.

In operation, Galileo will use two ground operations centers, near Munich in Germany and in Fucino in Italy. In December 2010 EU ministers in Brussels voted Prague in the Czech Republic as the headquarters of the Galileo project. On 21 Oct. 2011 the first two of four operational satellites were launched to validate the system. The next two followed on 12 Oct. 2012, making it "possible to test Galileo end-to-end". Once this In-Orbit Validation (IOV) phase has been completed, additional satellites will be launched to reach Initial Operational Capability (IOC) around mid-decade. The first determination of a position relying on signals emitted only from Galileo satellites was achieved on 12 Mar. 2013. Full completion of the 30-satellite Galileo system (27 operational and three active spares) is expected by 2019.

The use of basic (low-precision) Galileo services will be free and open to everyone. The high-precision capabilities will be available for paying commercial users and for military use. Galileo is intended to provide horizontal and vertical position measurements within 1-meter precision and better positioning services at high latitudes than other positioning systems.

As a further feature, Galileo will provide a unique global search and rescue (SAR) function. Satellites will be equipped with a transponder which will relay distress signals from the user's transmitter to the Rescue Co-ordination Center, which will then initiate the rescue operation. At the same time, the system will provide a signal to the users, informing them that their situation has been detected and that help is on the way. This latter feature is new and is considered a major upgrade compared to the existing GPS and GLONASS navigation systems, which do not provide feedback to the user. Tests in February 2014 found that for Galileo's search and rescue function, operating as part of the existing International Cospas-Sarsat Programme, 77% of simulated distress locations can be pinpointed within 2 km, and 95% within 5 km.

GLONASS is a global satellite navigation system, providing real time position and velocity determination for military and civilian users. The satellites are located in middle circular orbit at 19,100 km altitude with a 64.8 degree inclination and a period of 11 hours and 15 minutes.

GLONASS' orbit makes it especially suited for usage in high latitudes (north or south), where getting a GPS signal can be problematic. The constellation operates in three orbital planes, with 8 evenly spaced satellites on each. A fully operational constellation with global coverage consists of 24 satellites, while 18 satellites are necessary for covering the territory of Russia. To get a position fix the receiver must be in the range of at least four satellites.

GLONASS satellites transmit two types of signal: open standard-precision signal L1OF/L2OF, and obfuscated high-precision signal L1SF/L2SF. The signals use similar DSSS encoding and binary phase-shift keying (BPSK) modulation as in GPS signals. All GLONASS satellites transmit the same code as their standard-precision signal; however each transmits on a different frequency using a 15-channel frequency division multiple access (FDMA) technique spanning either side from 1602.0 MHz, known as the L1 band. The center frequency is 1602 MHz+n×0.5625 MHz, where n is a satellite's frequency channel number: (n=−7, −6, −5, . . . 0, . . . , 6, previously n=0, . . . , 13).

Signals are transmitted in a 38° cone, using right-hand circular polarization, at an EIRP between 25 to 27 dBW (316 to 500 watts). Note that the 24-satellite constellation is accommodated with only 15 channels by using identical frequency channels to support antipodal (opposite side of planet in orbit) satellite pairs, as these satellites will never be in view of an earth-based user at the same time.

The L2 band signals use the same FDMA as the L1 band signals, but transmit straddling 1246 MHz with the center frequency 1246 MHz+n×0.4375 MHz, where n spans the same range as for L1. In the original GLONASS design, only obfuscated high-precision signal was broadcast in the L2 band, but starting with GLONASS-M, an additional civil reference signal L2OF is broadcast with an identical standard-precision code to the L1OF signal.

The open standard-precision signal is generated with modulo-2 addition (XOR) of 511 kbit/s pseudo-random ranging code, 50 bit/s navigation message, and an auxiliary 100 Hz meander sequence (Manchester code), all generated using a single time/frequency oscillator. The pseudo-random code is generated with a 9-stage shift register operating with a period of 1 ms. The navigational message is modulated at 50 bits per second. The super frame of the open signal is 7500 bits long and consists of 5 frames of 30 seconds, taking 150 seconds (2.5 minutes) to transmit the continuous message. Each frame is 1500 bits long and consists of 15 strings of 100 bits (2 seconds for each string), with 85 bits (1.7 seconds) for data and check-sum bits, and 15 bits (0.3 seconds) for time mark. Strings 1-4 provide immediate data for the transmitting satellite, and are repeated every frame; the data include ephemeris, clock and frequency offsets, and satellite status. Strings 5-15 provide non-immediate data (i.e. almanac) for each satellite in the constellation, with frames I-IV each describing 5 satellites, and frame V describing remaining 4 satellites.

The ephemerides are updated every 30 minutes using data from the Ground Control segment; they use Earth Centered Earth Fixed (ECEF) Cartesian coordinates in position and velocity, and include lunisolar acceleration parameters. The almanac uses modified Keplerian parameters and is updated daily.

The more accurate high-precision signal is available for authorized users, such as the Russian Military, yet unlike the US P(Y) code which is modulated by an encrypting W code, the GLONASS restricted-use codes are broadcast in the clear using only 'security through obscurity'. The details of the high-precision signal have not been disclosed. The modulation (and therefore the tracking strategy) of the data bits on the L2SF code has recently changed from unmodulated to 250 bit/s burst at random intervals. The L1SF code is modulated by the navigation data at 50 bit/s without a Manchester meander code.

The high-precision signal is broadcast in phase quadrature with the standard-precision signal, effectively sharing the same carrier wave, but with a ten-times-higher bandwidth than the open signal. The message format of the high-precision signal remains unpublished, although attempts at reverse-engineering indicate that the super frame is composed of 72 frames, each containing 5 strings of 100 bits and taking 10 seconds to transmit, with total length of 36 000 bits or 720 seconds (12 minutes) for the whole navigational message. The additional data are seemingly allocated to critical Lunisolar acceleration parameters and clock correction terms.

At peak efficiency, the standard-precision signal offers horizontal positioning accuracy within 5-10 meters, vertical positioning within 15 meters, a velocity vector measuring within 10 cm/s, and timing within 200 ns, all based on measurements from four first-generation satellites simultaneously. The newer satellites such as GLONASS-M improve on this.

GLONASS uses a coordinate datum named "PZ-90" (Earth Parameters 1990-Parametry Zemli 1990), in which the precise location of the North Pole is given as an average of its position from 1900 to 1905. This is in contrast to the GPS's coordinate datum, WGS 84, which uses the location of the North Pole in 1984. As of Sep. 17, 2007 the PZ-90 datum has been updated to version PZ-90.02 which differs from WGS 84 by less than 40 cm (16 in) in any given direction. Since Dec. 31, 2013, version PZ-90.11 is being broadcast, that is aligned to the International Terrestrial Reference System at epoch 2011.0 at the centimeter level.

According to Russian System of Differential Correction and Monitoring's data, as of 2010, precisions of GLONASS navigation definitions (for p=0.95) for latitude and longitude were 4.46-7.38 m with mean number of navigation space vehicles (NSV) equals 7-8 (depending on station). In comparison, the same time precisions of GPS navigation definitions were 2.00-8.76 m with mean number of NSV equals 6-11 (depending on station). Civilian GLONASS used alone is therefore very slightly less accurate than GPS. On high latitudes (north or south), GLONASS' accuracy is better than that of GPS due to the orbital position of the satellites.

Some modern receivers are able to use both GLONASS and GPS satellites together, providing greatly improved coverage in urban canyons and giving a very fast time to fix due to over 50 satellites being available. In indoor, urban canyon or mountainous areas, accuracy can be greatly improved over using GPS alone. For using both navigation systems simultaneously, precisions of GLONASS/GPS navigation definitions were 2.37-4.65 m with mean number of NSV equals 14-19 (depends on station).

The latest satellite design, GLONASS-K has the ability to double the system's accuracy once introduced. The system's ground segment is also to undergo improvements. As of early 2012, sixteen positioning ground stations are under construction in Russia and in the Antarctic at the Bellingshausen and Novolazarevskaya bases. New stations will be built around the southern hemisphere from Brazil to Indonesia. Together, these improvements are expected to bring GLONASS' accuracy to 0.6 m or better by 2020.

Referring still to FIG. 2, the full US GPS system makes use of 3 frequency bands for the ranging signals: L1 band (54) (1565.42 MHz (82)-1585.42 MHz (84)); L2 band (46) (1217.6 MHz (68)-1237.6 MHz (70)), and L5 band (44) (1166.45 MHz (62)-1186.54 MHz (64)). By definition, EL1 band includes GPS L1 band; EL2 band includes GPS L2 and GPS L5 bands. GNSS band is used to describe any GNSS frequency including GPS frequencies.

Referring still to FIG. 2, the GLONASS system makes use of 2 frequency bands: G1 band (56) (1593.0625 MHz (88)-1610.375 MHz (90)) and G2 band (48) (1237.9375 (72)-1253.625 MHz (74)). EL1 band includes GLONASS G1 band; EL2 band includes GLONASS G2 band. GNSS band is used to describe any GNSS frequency including GLONASS frequencies.

Referring still to FIG. 2, the Galileo system makes use of 3 frequency bands: E1 band (52) (1559 MHz (80)-1591 MHz (86)), E6 band (50) (1260 MHz (76)-1300 MHz (78), and E5ab band (42) (1164 MHz (60)-1215 MHz (66)). By definition, EL1 band includes Galileo E1 band; EL2 band includes Galileo E6 and $E5_{ab}$ bands. GNSS band is used to describe any GNSS frequency including Galileo frequencies.

In order to receive signals from these multiple constellations, antennas are sometimes designed to encompass all the frequencies (1164-1610) MHz or break the problem in a couple of bands (1164-1300) MHz and (1559-1610) MHz.

In an embodiment of the present technology, the first multiband antenna (12 of FIG. 1) is selected from the group consisting of: a patch antenna; a helical antenna; and a crossed dipole antenna.

In an embodiment of the present technology, the first multiband antenna (12 of FIG. 1) comprises a patch antenna.

Patch antennas are simple to fabricate and easy to modify and customize. They are the original type of micro strip antenna described by Howell in 1972; the two metal sheets together form a resonant piece of micro strip transmission line with a length of approximately one-half wavelength of the radio waves.

The radiation mechanism arises from discontinuities at each truncated edge of the micro strip transmission line. The radiation at the edges causes the antenna to act slightly larger electrically than its physical dimensions, so in order for the antenna to be resonant, a length of micro strip transmission line slightly shorter than one-half a wavelength at the frequency is used.

For example, the Trimble® Zephyr™ Model 2 external dual-frequency antenna contains advanced technology for minimizing multipath, outstanding low elevation satellite tracking, and extremely precise phase center accuracy. The Zephyr Model 2 antenna can be mounted on a range pole—along with the Trimble GeoXH™ handheld—to give you a convenient all-on-the pole data collection solution. The Zephyr Model 2 antenna is the standard antenna for use with the Trimble GeoXH Centimeter edition handheld.

A patch antenna is usually constructed on a dielectric substrate, using the same materials and lithography processes used to make printed circuit boards.

The dielectric of the material reduces the size proportional to the square root of the effective dielectric constant. For example, in the Zephyr antenna the L1 wavelength is 7.5" in air and a ½ wavelength becomes 2.5" in the dielectric $(7.5/(2*\sqrt{(2.2)}))$. For some consumer patch antennas, the dielectric can be as high as 30 thus the size is quite small (17 mm$^2$). The gain of the antenna decreases with the physical size so one would like as big a patch area as possible for maximum signal reception (higher signal-to noise ratio C/No).

A patch antenna (also known as a rectangular micro strip antenna) manufactured by Magellan, Headquartered in San Dimas, Calif., is a type of radio antenna with a low profile, which can be mounted on a flat surface. It consists of a flat rectangular sheet or "patch" of metal, mounted over a larger sheet of metal called a ground plane. The assembly is usually contained inside a plastic radome, which protects the antenna structure from damage.

A radome (the word is a contraction of radar and dome) is a structural, weatherproof enclosure that protects a microwave (e.g. radar) antenna. The radome is constructed of material that minimally attenuates the electromagnetic signal transmitted or received by the antenna. In other words, the radome is transparent to radar or radio waves. Radome protects the antenna surfaces from weather or conceals antenna electronic equipment from public view. They also protect nearby personnel from being accidentally struck by quickly-rotating antennas.

Radome can be constructed in several shapes (spherical, geodesic, planar, etc.) depending upon the particular application using various construction materials (fiberglass, polytetrafluoroethylene (PTFE)-coated fabric, etc.).

When found on fixed-wing aircraft with forward-looking radar (as are commonly used for object or weather detection), the nose cones often additionally serve as radome.

On a rotary-wing and fixed-wing aircraft using microwave satellite for beyond-line-of-sight communication, radome often appear as blisters on the fuselage. In addition to protection, radome also streamlines the antenna system, thus reducing drag.

The simplest patch antenna uses a patch which is one-half wavelength long, mounted a precise distance above a larger ground plane, sometimes using a spacer made of a dielectric between them. Electrically large ground planes produce stable patterns and lower environmental sensitivity but of course make the antenna bigger. It isn't uncommon for the ground plane to be only modestly larger than the active patch. When a ground plane is close to the size of the radiator it can couple and produce currents along the edges of the ground plane which also radiate. The antenna pattern becomes the combination of the two sets of radiators.

The current flow is along the direction of the feed wire, so the magnetic vector potential and thus the electric field follow the current. A simple patch antenna of this type radiates a linearly polarized wave. The radiation can be regarded as being produced by the "radiating slots" at top and bottom, or equivalently as a result of the current flowing on the patch and the ground plane.

The gain of a rectangular micro strip patch antenna with air dielectric can be very roughly estimated as follows. Since the length of the patch, half a wavelength, is about the same as the length of a resonant dipole, we get about 2 dB of gain from the directivity relative to the vertical axis of the patch. If the patch is square, the pattern in the horizontal plane will be directional, somewhat as if the patch were a pair of dipole separated by a half-wave; this counts for about another 2-3 db. Finally, the addition of the ground plane cuts off most or all radiation behind the antenna, reducing the power averaged over all directions by a factor of 2 (and thus increasing the gain by 3 dB). Adding this all up, we get about 7-9 dB for a square patch, in good agreement with more sophisticated approaches.

FIG. 3 depicts a typical radiation pattern 80 for a linearly-polarized 900-MHz patch antenna. The figure shows a cross-section in a horizontal plane; the pattern in the vertical plane is similar though not identical. The scale is logarithmic, so (for example) the power radiated at 180° (90° to the left of the beam center) is about 15 dB less than the power in the center of the beam. The beam width is about 65° and the gain is about 9 dB An infinitely-large ground plane would prevent any radiation towards the back of the antenna (angles from 180 to 360°), but the real antenna has a fairly small ground plane, and the power in the backwards direction is only about 20 dB down from that in the main beam.

The impedance bandwidth of a patch antenna is strongly influenced by the spacing between the patch and the ground plane. As the patch is moved closer to the ground plane, less energy is radiated and more energy is stored in the patch capacitance and inductance: that is, the quality factor Q of the antenna increases.

A very rough estimate of the bandwidth is $$\frac{\delta f}{f_{res}} = \frac{Z_0}{2R_{rad}} \frac{d}{W}, \tag{1}$$

where d is the height of the patch above the ground plane, W is the width (typically a half-wavelength), $Z_0$ is the impedance of free space, and $R_{rad}$ is the radiation resistance of the antenna. The fractional bandwidth of a patch antenna is linear in the height of the antenna.

The impedance of free space is approximately 377 ohms, so for the typical radiation resistance of about 150 ohms, a simplified expression can be obtained $$\frac{\delta f}{f_{res}} = 1.2 \left(\frac{d}{W}\right), \tag{2}$$

For a square patch at 900 MHz, W will be around 16 cm. A height d of 1.6 cm will provide a fractional bandwidth of around $1.2(1.6/16) \approx 12\%$, which gives a Bandwidth of 108 MHz at the center frequency.

A patch printed onto a dielectric board is often more convenient to fabricate and is a bit smaller, but the volume of the antenna is decreased, so the bandwidth decreases because the Q increases, roughly in proportion to the dielectric constant of the substrate. Patch antennas utilized by industry often use ground planes which are only modestly larger than the patch, which also alters their performance. The details of the feed structure affect bandwidth as well.

FIG. 4 is a diagram 110 that illustrates the negative return loss for a pair of representative patch antennas; both antennas are nominally designed to operate in the US Industrial, Scientific, and Medical (ISM) band from 902 MHz-to 928 MHz.

Antenna B (112) uses a 16-mm patch height above ground, and the measured bandwidth of about 150 MHz at 10 dB return loss is rather close to that estimated above. However, this antenna also uses a very large (30 cm×30 cm) ground plane.

On the other hand, antenna A (114) delivers similar bandwidth, but at about 20 cm×20 cm it is considerably smaller and more convenient to mount and position.

Commercial patch antennas vary widely in performance, often due to poor centering of the band even when theoretical bandwidth is achieved. Rectangular (non-square) patches can be used when it is desired to produce a fan beam: a radiated wave whose vertical and horizontal beam widths are substantially different. Circular patches can be used instead of square patches; fabrication is straightforward though calculating the current distribution is more involved.

Figure 5:
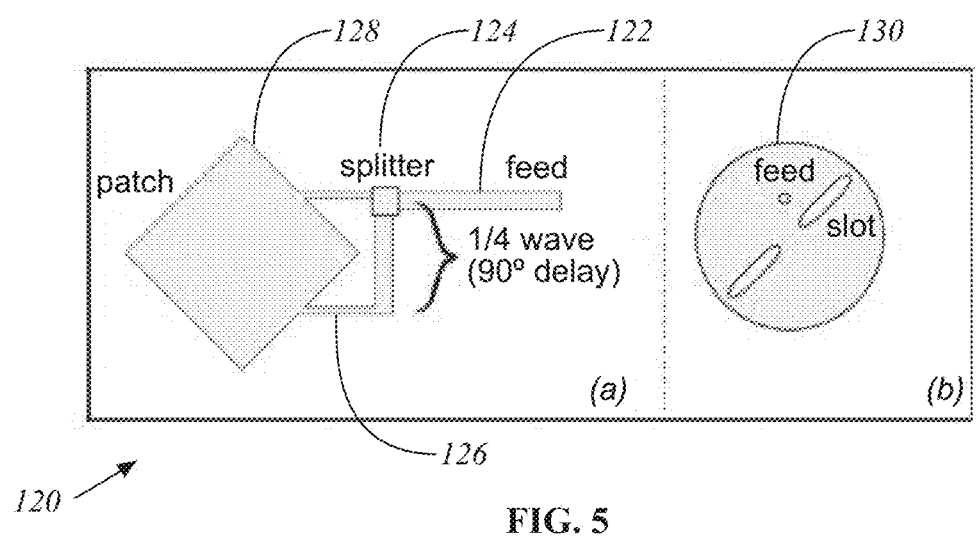
FIG. 5 shows patch antennas that radiate circularly-polarized waves with two feeds, with one feed delayed by 90° with respect to the other.

FIG. 5 shows patch antennas 128 that radiate circularly-polarized waves with two feeds 122 and 126 entering the patch antenna via slots 130. The first feed (126) is delayed by 90° with respect to the second feed (122) by using a splitter 124. This feed configuration drives each transverse mode $TM_{10}$ and $TM_{01}$ with equal amplitudes and 90° degrees out of phase.

In an embodiment of the present technology, the first multiband antenna (12 of FIG. 1) comprises a helical antenna.

Figure 6:
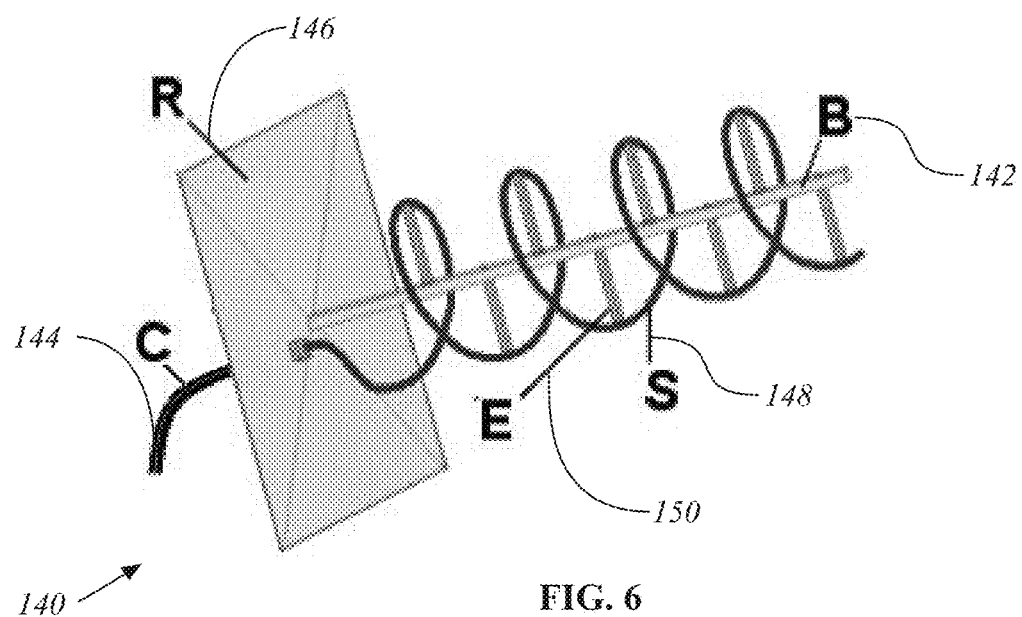
FIG. 6 depicts an axial-mode helical antenna.

FIG. 6 depicts an axial-mode helical antenna 140 including the following elements: the general support element B (142), the coaxial cable feed line C (144), the spacers/supports for the helix E (150), the reflector ground plane R (146), and the helical element S (148).

More specifically, as shown in FIG. 6, the helical antenna 140 is an antenna consisting of a conducting wire wound in the form of a helix 148. In most cases, helical antennas are mounted over the ground plane 146. The feed line 144 is connected between the bottom of the helix 148 and the ground plane 146. Helical antennas can operate in one of two principal modes: normal mode or axial mode.

There are two main modes of operations for helix antennas: a normal mode and an axial mode.

In the normal mode (or broadside helix), the dimensions of the helix (the diameter and the pitch) are small compared with the wavelength. The antenna acts similarly to an electrically short dipole or monopole, and the radiation pattern, similar to these antennas is omnidirectional, with maximum radiation at right angles to the helix axis. The radiation is linearly polarized parallel to the helix axis.

In the normal mode, the helix design enabling the radiation at 90 degrees from the axis of the helix is efficient as a practical reduced-length radiator when compared with the operation of other types such as base-loaded, top-loaded or center-loaded whips. This kind of design is typically used for applications where the reduced size of a helix antenna is a critical operational factor.

The simple and practical helical antennas were primarily designed to replace very large antennas. Their reduced size is therefore most suitable for mobile and portable high-frequency (HF) communications in the 1 MHz to 30 MHz operating range. A common form of normal-mode helical antenna is the Rubber Ducky antenna used in portable radios. The loading provided by the helix allows the antenna to be shorter than its electrical length of a quarter-wavelength.

An effect of using a helical conductor rather than a straight one is that the matching impedance is changed from the nominal 50 ohms to between 25 to 35 ohms base impedance. This does not seem to be adverse to operation or matching with a normal 50 ohm transmission line, provided the connecting feed is the electrical equivalent of a ½ wave at the frequency of operation.

Another example of a helical antenna type used in mobile communications is a "spaced constant turn" helical antenna in which two or more different linear windings are wound on a single former and spaced so as to provide an efficient balance between capacitance and inductance for the radiating element at a particular resonant frequency.

Many examples of a "spaced constant turn" helical antenna have been used extensively for 27 MHz CB radio with a wide variety of designs originating in the US and Australia in the late 1960 s. Multi-frequency versions with plug-in taps have become the mainstay for multi-band Single-sideband modulation (SSB) HF communications.

In most cases, a spaced constant turn" helical antenna includes a copper wire with a flexible radiator covered with heat-shrink tubing which provides a resilient and rugged waterproof covering for the finished mobile antenna.

These popular designs are still in common use as of today (2014) and have been universally adapted as standard FM receiving antennas for many factory produced motor vehicles as well as the existing basic style of aftermarket HF and VHF mobile helical. The most common use for broadside helixes is in the Rubber Ducky antenna found on most portable VHF and UHF radios.

In an axial mode (or end-fire helix), the dimensions of the helix are comparable to a wavelength. The antenna functions as a directional antenna radiating a beam off the ends of the helix, along the antenna's axis. It radiates circularly polarized radio waves.

In radio transmission, circular polarization is often used where the relative orientation of the transmitting and receiving antennas cannot be easily controlled, such as in animal tracking and spacecraft communications, or where the polarization of the signal may change, so end-fire helical antennas are frequently used for these applications.

Since large helices are difficult to build and unwieldy to steer and aim, the axial mode (or end-fire helix) design is commonly employed only at higher frequencies, ranging from VHF up to microwave.

The helix in an antenna can twist in two possible directions: right-handed or left-handed, as defined by the right hand rule. In an axial-mode helical antenna the direction of twist of the helix determines the polarization of the radio waves: a left-handed helix radiates left-circularly-polarized radio waves, a right-handed helix radiates right-circularly-polarized radio waves.

Helical antennas can receive signals with any type of linear polarization, such as horizontal or vertical polarization, but when receiving circularly polarized signals the handedness of the receiving antenna should be the same as the transmitting antenna; left-hand polarized antennas suffer a severe loss of gain when receiving right-circularly-polarized signals, and vice versa.

The dimensions of a helix are determined by the wavelength λ, of the radio waves used, which depends on the frequency. In an axial-mode operation, the spacing between the coils should be approximately one-quarter of the wavelength (λ/4), and the diameter of the coils should be approximately the wavelength divided by pi (λ/π). The length of the coil determines how directional the antenna will be as well as its gain. The longer antennas will be more sensitive in the direction in which they point.

Terminal impedance in an axial mode ranges between 100 and 200 ohms. The resistive part is approximated by:

$$R \simeq 140\left(\frac{C}{\lambda}\right), \quad (3)$$

where R is resistance in ohms, C is the circumference of the helix, and λ is the wavelength. Impedance matching to the cable C is often done by a short strip line section between the helix and the cable termination.

The maximum directive gain is approximately:

$$D_o \simeq 15N\frac{C^2 S}{\lambda^3}. \quad (4)$$

where N is the number of turns and S is the spacing between turns.

The half-power beam width is:

$$HPBW \simeq \frac{52\lambda^{3/2}}{C\sqrt{NS}} \text{ degrees}. \quad (5)$$

whereas the beam width between nulls is:

$$FNBW \simeq \frac{115\lambda^{3/2}}{C\sqrt{NS}} \text{ degrees} \quad (6)$$

In an embodiment of the present technology, the first multiband antenna (12 of FIG. 1) comprises a crossed dipole antenna.

Figure 6A:
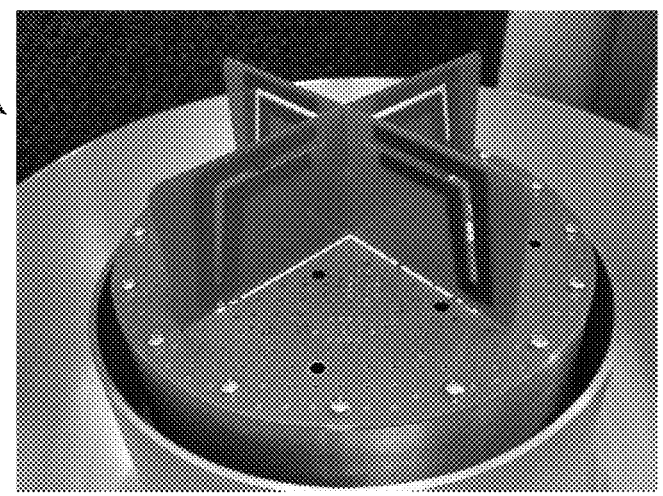
FIG. 6A illustrates a crossed folded dipole antenna.

Cross dipole antennas are illustrated in FIG. 6A (152—a crossed folded dipole antenna, FIG. 6B (154—a bowtie dipole antenna), and FIG. 6C (156—a droopy dipole antenna).

In radio and telecommunications a dipole antenna (or doublet) is the simplest and most widely used class of antenna. It consists of two identical conductive elements such as metal wires or rods, which are usually bilaterally symmetrical. The driving current from the transmitter is applied, or for receiving antennas the output signal to the receiver is taken, between the two halves of the antenna. Each side of the feed line to the transmitter or receiver is connected to one of the conductors. This contrasts with a monopole antenna, which consists of a single rod or conductor with one side of the feed line connected to it, and the other side connected to some type of ground. A common example of a dipole is the "rabbit ears" television antenna found on broadcast television sets.

The most common form of dipole is two straight rods or wires oriented end to end on the same axis, with the feed line connected to the two adjacent ends, as shown in FIG. 6A (152—a crossed folded dipole antenna). This is the simplest type of antenna from a theoretical point of view.

Dipoles are resonant antennas, meaning that the elements serve as resonators, with standing waves of radio current flowing back and forth between their ends. So the length of the dipole elements is determined by the wavelength of the radio waves used. The most common form, as was mentioned above, is the half-wave dipole, in which each of the two rod elements is approximately ¼ wavelength long, so the whole antenna is a half-wavelength long.

A folded dipole has a central impedance of about 300 ohms. Therefore, the simplest way of feeding a folded dipole antenna is using a 300-ohm ladder line. Ideally, a half-wave dipole should be fed with a balanced line matching the theoretical 73-ohm impedance of the antenna.

A bowtie antenna, as shown in FIG. 6B (154—a bowtie dipole antenna) is a wire approximation in two dimensions of a biconic dipole antenna (used, for example, for UHF television reception).

The biconical antenna has a broad bandwidth because it is an example of a travelling wave structure; the analysis for a theoretical infinite antenna resembles that of a transmission line. For an infinite antenna, the characteristic impedance at the point of connection is a function of the cone angle only and is independent of the frequency. Practical antennas have finite length and a definite resonant frequency.

Another beam width-performance variable relates to the deflection or "droop" of the crossed-dipole radiating element arms, which can range from nearly horizontal to a "full droop" position attached at their ends to a ground plane (as shown in FIG. 6C—156—a droopy dipole antenna).

The wider beam widths are achieved by increasing the downward deflection whereas multipath rejection is enhanced by decreasing droop. Preferably, a selectable gain antenna accommodates such alternative configurations without significantly varying the input impedance whereby common matching and phasing networks can be used for all applications.

Referring still to FIG. 1, in an embodiment of the present technology, the second multiband antenna (14 of FIG. 1) is selected from the group consisting of: a patch antenna; a helical antenna; and a cross dipole antenna.

Referring still to FIG. 1, in an embodiment of the present technology, the first multiband antenna 12 includes a first phase center 24 configured to represent a first phase data collected by the first multiband antenna 12 in the first multiband of electromagnetic spectrum band-1.

Referring still to FIG. 1, in an embodiment of the present technology, the second multiband antenna 14 includes a second phase center 22 configured to represent a second phase data collected by the second multiband antenna 14 in the second multiband of electromagnetic spectrum band-2.

Referring still to FIG. 1, in an embodiment of the present technology, the first phase center 24 of the first multiband antenna 12 is separated from the second phase center 22 of the second multiband antenna 14 by the separation distance d (17).

Referring still to FIG. 1, in an embodiment of the present technology, the multiband antenna apparatus further includes the antenna phase reference point 16 configured to represent an integrated electric phase data by integrating the first phase data collected by the first multiband antenna 12 in the first multiband band-1 of the electromagnetic spectrum and by integrating the second phase data collected by the second multiband antenna 14 in the second multiband band-2 of electromagnetic spectrum. The antenna phase reference point 16 is related to a physical reference point (not shown) of the antenna apparatus 10. Please, see discussion below.

The given below discussion is focused on patch antennas.

Referring still to FIG. 1, in an embodiment of the present technology, the first multiband antenna 12 further comprises a right-hand circular polarized first multiband antenna 12.

Referring still to FIG. 1, in an embodiment of the present technology, the first right-hand circular polarized multiband antenna 12 is selected from the group consisting of: a single probe fed rectangular patch antenna (not shown); a two probe fed square patch antenna (not shown); and a four probe fed square patch antenna (not shown).

Referring still to FIG. 1, in an embodiment of the present technology, the first multiband patch antenna 12 is selected from the group consisting of: a rectangular metal patch antenna (not shown); a square metal patch antenna (not shown); a circle metal patch antenna (not shown); and a triangle metal patch antenna (not shown).

Referring still to FIG. 1, in an embodiment of the present technology, the first multiband patch antenna 12 further comprises: a patch antenna located above a ground plane with a dielectric material in between the metal parts (not shown).

Referring still to FIG. 1, in an embodiment of the present technology, the first multiband patch antenna 12 further comprises a patch antenna having a size of a resonance wavelength corresponding to a half of a dielectrically compensated wavelength at the center frequency of the first multiband band-1.

Referring still to FIG. 1, in an embodiment of the present technology, the first multiband patch antenna 12 further comprises a patch antenna being excited through a feeding method selected from the group consisting of: a micro strip feeding method; a probe feeding method; and an aperture coupled feeding method (not shown).

Referring still to FIG. 1, in an embodiment of the present technology, the second multiband antenna 14 further comprises a right-hand circular polarized first multiband antenna 14.

Referring still to FIG. 1, in an embodiment of the present technology, the second right-hand circular polarized multiband antenna 14 is selected from the group consisting of: a single probe fed rectangular patch antenna (not shown); a two probe fed square patch antenna (not shown); and a four probe fed square patch antenna (not shown).

Referring still to FIG. 1, in an embodiment of the present technology, the second multiband patch antenna 14 is selected from the group consisting of: a rectangular metal patch antenna (not shown); a square metal patch antenna (not shown); a circle metal patch antenna (not shown); and a triangle metal patch antenna (not shown).

Referring still to FIG. 1, in an embodiment of the present technology, the second multiband patch antenna 14 further comprises: a patch antenna located above a ground plane with a dielectric material in between the metal parts (not shown).

Referring still to FIG. 1, in an embodiment of the present technology, the second multiband patch antenna 14 further comprises a patch antenna having a size of a resonance wavelength corresponding to a half of a dielectrically compensated wavelength at the center frequency of the second multiband band-2.

Referring still to FIG. 1, in an embodiment of the present technology, the second multiband patch antenna 14 further comprises a patch antenna being excited through a feeding method selected from the group consisting of: a micro strip feeding method; a probe feeding method; and an aperture coupled feeding method (not shown).

High-precision GNSS antenna systems have been traditionally designed in such a way that the electrical centers of each frequency band are coincident in both horizontal and vertical directions. Or at least the antenna elements are coincident to within mm-level.

Having the L1 and L2 GPS antenna phase centers practically coincident in a horizontal sense, means that the azimuthal orientation of the antenna does not need to be known for the purposes of transferring the antenna position to the measurement point of interest. Small vertical offsets of a cm or less are common in multi-band patch antennas. Vertical offsets are more readily compensated for by assuming that the antenna is nearly always maintained in a level condition. Of course in many practical kinematic examples, the antenna is tilted; however the effect is relatively minor in the derived position.

However, the multi-band antenna systems are expensive, rivalling the hardware components cost of an entire GNSS receiver. Part of the cost is due to the limited number of manufacturers of high-quality antenna elements with stable antenna phase centers. Part of the cost is due to the complexity of the design. The necessity to use multiple signals feeds to pull the various frequency bands from the antenna element leads to manufacturing complexity and cost.

To deal with this high manufacturing complexity and cost, one approach was to question the need for designing antennas where all frequency bands share a common electrical center.

An alternative approach was to come up with a design where the different frequency bands can have horizontally separated phase centers. It turns out that this approach is attractive in terms of cost reduction and has some side benefits for heading determination and antenna tilt compensation.

The following discussion is focused on how horizontally separated multi-band antennas can be used for high-precision GNSS positioning.

Users are usually interested in the location of a measurement point (a ground mark, or central axis of a vehicle, say) and therefore the relationship between antenna and point of interest are described.

One of the largest error sources affecting GNSS measurements is caused by the ionosphere. The ionosphere is the portion of the earth's atmosphere from approximately (50-1000) km altitude, where charged particles lead to dispersion of GNSS signals as they pass through the medium. Code measurements suffer a time delay, while carrier phase is advanced by an equal (but opposite) amount to the code.

All Global Navigation Satellite Systems broadcast signals on two or more frequency bands so that a first-order correction for the ionospheric bias can be applied to measurements. There are many factors that influence the ionospheric bias, including time of day, satellite elevation angle, solar activity, etc. The highly dynamic nature of the ionosphere makes ionospheric errors very difficult to accurately model.

GPS satellites broadcast the parameters of the Klobuchar Ionospheric Model for single frequency users. The Klobuchar model was designed to minimize user computational complexity and user computer storage as far as to keep a minimum number of coefficients to transmit on satellite-user link.

This broadcast model is based on an empirical approach (Klobuchar, J., 1987. *Ionospheric Time Delay Algorithms for*

*Single-Frequency GPS Users*. IEEE Transactions on Aerospace and Electronic Systems (3), pp. 325-331), and is estimated to reduce about the 50% RMS ionospheric range error worldwide.

Dual-frequency and triple-frequency GNSS users therefore have a significant advantage over single-frequency users in terms of absolute positioning and Real Time Kinematic (RTK), and/or RTX (Real Time eXtended) (please, see below).

Real Time Kinematic (RTK) satellite navigation is a technique used to enhance the precision of position data derived from satellite-based positioning systems, being usable in conjunction with GPS, GLONASS and/or Galileo. It uses measurements of the phase of the signal's carrier wave, rather than the information content of the signal, and relies on a single reference station to provide real-time corrections, providing up to centimeter-level accuracy. With reference to GPS in particular, the system is commonly referred to as Carrier-Phase Enhancement, or CPGPS. It has application in land survey and in hydrographic survey.

A conventional satellite navigation receiver should align signals sent from the satellite to an internally generated version of a pseudorandom binary sequence, also contained in the signal. Since the satellite signal takes time to reach the receiver, the two sequences do not initially coincide; the satellite's copy is delayed in relation to the local copy. By increasingly delaying the local copy, the two copies can eventually be aligned. The correct delay represents the time needed for the signal to reach the receiver, and from this the distance from the satellite can be calculated.

The accuracy of the resulting range measurement is essentially a function of the ability of the receiver's electronics to accurately process signals from the satellite. In general receivers are able to align the signals to about 1% of one bit-width. For instance, the coarse-acquisition (C/A) code sent on the GPS system sends a bit every 0.98 microsecond, so a receiver is accurate to 0.01 microsecond, or about 3 meters. The military-only P(Y) signal sent by the same satellites is clocked ten times faster, so with similar techniques the receiver will be accurate to about 30 cm. Other effects introduce errors much greater than this, and accuracy based on an uncorrected C/A signal is generally about 15 m.

RTK follows the same general concept, but uses the satellite signal's carrier wave as its signal, ignoring the information contained within. The improvement possible using this signal is potentially very high if one continues to assume a 1% accuracy in locking. For instance, in the case of GPS, the coarse-acquisition (C/A) code (broadcast in the L1 signal) changes phase at 1.023 MHz, but the L1 carrier itself is 1575.42 MHz, over a thousand times more often. The carrier frequency corresponds to a wavelength of 19 cm for the L1 signal. A ±1% error in L1 carrier phase measurement thus corresponds to a ±1.9 mm error in baseline estimation.

The difficulty in making an RTK system is properly aligning the signals. The navigation signals are deliberately encoded in order to allow them to be aligned easily, whereas every cycle of the carrier is similar to every other. This makes it extremely difficult to know if you have properly aligned the signals or if they are "off by one" and are thus introducing an error of 20 cm, or a larger multiple of 20 cm. This integer ambiguity problem can be addressed to some degree with sophisticated statistical methods that compare the measurements from the C/A signals and by comparing the resulting ranges between multiple satellites. However, none of these methods can reduce this error to zero.

In practice, RTK systems use a single base station receiver and a number of mobile units. The base station re-broadcasts the phase of the carrier that it observes, and the mobile units compare their own phase measurements with the one received from the base station. There are several ways to transmit a correction signal from base station to mobile station. The most popular way to achieve real-time, low-cost signal transmission is to use a radio modem, typically in the UHF band. In most countries, certain frequencies are allocated specifically for RTK purposes. Most land survey equipment has a built-in UHF band radio modem as a standard option. This allows the units to calculate their relative position to within millimeters, although their absolute position is accurate only to the same accuracy as the computed position of the base station. The typical nominal accuracy for these systems is 1 centimeter±2 parts-per-million (ppm) horizontally and 2 centimeters±2 ppm vertically.

Although these parameters limit the usefulness of the RTK technique for general navigation, the technique is perfectly suited to roles like surveying. In this case, the base station is located at a known surveyed location, often a benchmark, and the mobile units can then produce a highly accurate map by taking fixes relative to that point. RTK has also found uses in auto drive/autopilot systems, precision farming, Machine Control systems and similar roles.

The Virtual Reference Station (VRS) method extends the use of RTK to a whole area of a reference station network. Operational reliability and accuracy depend on the density and capabilities of the reference station network.

A Continuously Operating Reference Station (CORS) network is a network of RTK base stations that broadcast corrections, usually over an Internet connection. Accuracy is increased in a CORS network, because more than one station helps ensure correct positioning and guards against a false initialization of a single base station.

For RTK operation, multi-frequency equipment is able to measure relative position over longer baseline vectors than single-frequency equipment.

RTX (Real Time eXtended) is Trimble's proprietary Precise Point Positioning (PPP) service/system that produces delivers centimeter-level positioning using a worldwide network of tracking stations. For the reference, please, see (http://www.trimble.com/agriculture/correctionservices/centerPointRTX-satellite.aspx).

More specifically, mid of 2011 Trimble introduced the CenterPoint RTX (Real Time eXtended) real-time positioning service providing cm-accurate positions for real-time applications. This service targets applications in the precision markets like Precision Agriculture, Survey and Construction, and relies on the generation of precise orbit and clock information for GPS and GLONASS satellites in real-time. The CenterPoint RTX (Real Time eXtended) satellite corrections are generated with data from Trimble's worldwide tracking network, consisting of approximately 100 globally distributed reference stations. A subset of currently 25 stations in the Asia-Pacific region is able to track the Quasi-Zenith Satellite System (QZSS) satellite.

The Quasi-Zenith Satellite System (QZSS), is a proposed three-satellite regional time transfer system and Satellite Based Augmentation System for the Global Positioning System, that would be receivable within Japan. The first satellite 'Michibiki' was launched on 11 Sep. 2010. Full operational status was expected by 2013. In March 2013, Japan's Cabinet Office announced the expansion of the Quasi-Zenith Satellite System from three satellites to four.

The $526 million contract with Mitsubishi Electric for the construction of three satellites is slated for launch before the end of 2017.

Authorized by the Japanese government in 2002, work on a concept for a Quasi-Zenith Satellite System (QZSS), or Juntencho (準天頂) in Japanese, began development by the Advanced Space Business Corporation (ASBC) team, including Mitsubishi Electric, Hitachi, and GNSS Technologies Inc. However, ASBC collapsed in 2007. The work was taken over by the Satellite Positioning Research and Application Center. SPAC is owned by four departments of the Japanese government: the Ministry of Education, Culture, Sports, Science and Technology, the Ministry of Internal Affairs and Communications, the Ministry of Economy, Trade and Industry, and the Ministry of Land, Infrastructure and Transport.

QZSS is targeted at mobile applications, to provide communications-based services (video, audio, and data) and positioning information. With regards to its positioning service, QZSS can only provide limited accuracy on its own and is not currently required in its specifications to work in a standalone mode. As such, it is viewed as a GNSS Augmentation service. Its positioning service could also collaborate with the geostationary satellites in Japan's Multi-Functional Transport Satellite (MTSAT), currently under development, which itself is a Satellite Based Augmentation System similar to the U.S. Federal Aviation Administration's Wide Area Augmentation System (WAAS).

QZSS uses three satellites, each 120° apart, in highly inclined, slightly elliptical, geosynchronous orbits. Because of this inclination, they are not geostationary; they do not remain in the same place in the sky. Instead, their ground traces are asymmetrical figure-8 patterns (analemmas), designed to ensure that one is almost directly overhead (elevation 60° or more) over Japan at all times.

The primary purpose of QZSS is to increase the availability of GPS in Japan's numerous urban canyons, where only satellites at very high elevation can be seen. A secondary function is performance enhancement, increasing the accuracy and reliability of GPS derived navigation solutions.

The Quasi-Zenith Satellites (QZSS) transmit signals compatible with the GPS L1C/A signal, as well as the modernized GPS L1C, L2C signal and L5 signals. This minimizes changes to existing GPS receivers.

Compared to standalone GPS, the combined system GPS plus QZSS delivers improved positioning performance via ranging correction data provided through the transmission of sub-meter-class performance enhancement signals L1-SAIF and LEX from QZSS. It also improves reliability by means of failure monitoring and system health data notifications. QZSS also provides other support data to users to improve GPS satellite acquisition.

According to its original plan, QZSS was to carry two types of space-borne atomic clocks: a hydrogen maser and a rubidium (Rb) atomic clock. The development of a passive hydrogen maser for QZSS was abandoned in 2006. The positioning signal will be generated by an Rb clock and architecture similar to the GPS timekeeping system will be employed. QZSS will also be able to use a Two-Way Satellite Time and Frequency Transfer (TWSTFT) scheme, which will be employed to gain some fundamental knowledge of satellite atomic standard behavior in space as well as for other research purposes.

Although the first generation QZSS timekeeping system (TKS) will be based on the Rb clock, the first QZS, will carry a basic prototype of an experimental crystal clock synchronization system. During the first half of the two year in-orbit test phase, preliminary tests will investigate the feasibility of the atomic clock-less technology which might be employed in the second generation QZSS.

The mentioned QZSS TKS technology is a novel satellite timekeeping system which does not require on-board atomic clocks as used by existing navigation satellite systems such as GPS, GLONASS or the planned Galileo system. This concept is differentiated by the employment of a synchronization framework combined with lightweight steerable on-board clocks which act as transponders re-broadcasting the precise time remotely provided by the time synchronization network located on the ground. This allows the system to operate optimally when satellites are in direct contact with the ground station, making it suitable for a system like the Japanese QZSS. Low satellite mass and low satellite manufacturing and launch cost are significant advantages of this system.

Medium Earth orbit (MEO), sometimes called intermediate circular orbit (ICO), is the region of space around the Earth above low Earth orbit (altitude of 2,000 kilometers (1,243 mi)) and below geostationary orbit (altitude of 35,786 kilometers (22,236 mi)). The most common use for satellites in this region is for navigation, communication, and geodetic/space environment science. The most common altitude is approximately 20,200 kilometers (12,552 mi), which yields an orbital period of 12 hours, as used, for example, by the Global Positioning System (GPS). Other satellites in Medium Earth Orbit include GLONASS (with an altitude of 19,100 kilometers (11,868 mi)) and Galileo (with an altitude of 23,222 kilometers (14,429 mi)) constellation. Communications satellites that cover the North and South Pole are also put in MEO. The orbital periods of MEO satellites range from about 2 to nearly 24 hours. Telstar 1, an experimental satellite launched in 1962, orbits in MEO. The orbit is home to a number of satellites.

Dual-frequency and triple-frequency GNSS users therefore have a significant advantage over single-frequency users in terms of absolute positioning and RTX (Real Time eXtended).

In 2012 Trimble announced that its high-accuracy, satellite-delivered CenterPoint™ RTX™ (Real Time eXtended) correction service was available for farmers across the entire U.S. as well as most of Europe, Russia and the Commonwealth of Independent States, Africa, Asia and Australasia. Powered by Trimble RTX (Real Time eXtended) technology, CenterPoint RTX is a GPS, GLONASS and QZSS enabled correction service which can offer better than 4 centimeter (1.5 inch) repeatable accuracy in real-time without the use of traditional reference station RTK infrastructure. Previously, the CenterPoint RTX satellite-delivered correction service covered only the central swath of the U.S. and Canada, as well as Central and South America.

Trimble CenterPoint RTX (Real Time eXtended) real-time corrections are satellite delivered directly to the GNSS receiver, so there are no additional costs for mobile data plans or hardware such as radios and antennas. The CenterPoint RTX service is compatible with the Trimble CFX-750™ display; FmX® integrated display and the AG-372 GNSS receiver. For the reference, please see www.trimble.com/agcorrectionservices.

Trimble RTX (Real Time eXtended) is a high-accuracy GNSS correction technology delivering repeatable positions worldwide. By combining real-time data with innovative positioning and compression algorithms, Trimble RTX technology utilizes data from a global reference station infrastructure to compute centimeter level positions based on satellite orbit and clock information. Trimble RTX technology enables various solutions—Trimble CenterPoint RTX, both standard and immediate convergence in real-time, as well as the recently announced post-processing variant, Trimble Pivot™ RTX App and Trimble Pivot RTX App-PP infrastructure solutions, as well as the Trimble xFill™ feature for surveyors.

In 2014 Trimble announced that it's innovative Trimble CenterPoint™ RTX correction service is now available for heavy civil construction applications. Available worldwide as a subscription service, CenterPoint RTX will offer construction companies a flexible and easy to deploy option for conducting pre-bid reconnaissance and initial site measurements without using a traditional base station.

Based on Trimble RTX technology, CenterPoint RTX (Real Time eXtended) is a satellite-delivered positioning source that streams GNSS corrections to rover systems with the Trimble SPS985 GNSS Smart Antenna, SPS985L GNSS Smart Antenna or SPS855 GNSS Modular Receiver. There is no need to have an additional data plan or additional hardware.

The CenterPoint RTX (Real Time eXtended) service is the ideal correction source for construction sites in the pre-bid and site planning phases. Construction surveyors and estimating teams can use CenterPoint RTX (Real Time eXtended) to perform topographic surveys, estimate quantities and conduct site planning quickly and easily, before a base station is needed on site for machine control and other high-accuracy applications.

Trimble CenterPoint RTX (Real Time eXtended) is a subscription service available through Trimble Positioning Services in North America, South America, most of Europe, Russia and the Commonwealth of Independent States (CIS), Africa, Asia and Australasia.

High-precision GNSS applications rely on carrier phase measurements to achieve cm-level accuracy. Carrier phase measurements are subject to an integer cycle ambiguity which should be resolved in order to obtain utmost position accuracy. Because of its importance, carrier phase ambiguity resolution is a well-researched subject and a number of techniques have been developed for quickly and reliably determining the correct carrier phase ambiguities (see Teunissen, P. J. G., et. al. 1995, "A New Way to Fix Carrier-Phase Ambiguities", GPS WORLD Magazine, Innovation Column, April).

It is well-recognized that the reliability and speed of ambiguity resolution is greatly accelerated with the aid of dual- and triple-frequency GNSS data compared with single-frequency data. Multi-frequency data helps to reduce the number of integer search candidates that need to be searched within a given search volume. Linear combinations of multi-frequency GNSS data can be formed for the purposes of aiding ambiguity resolution. A good example is the wide-lane L1/L2 combination, which has an effective wavelength of ~86 cm, compared to L1 and L2 wavelengths of ~20 cm. The longer wavelength infers that fewer integer candidates need to be searched in order to isolate the correct set.

Multipath errors are caused by reflection of signals off objects that are near to the receiving antenna. Interference of direct and multipath signals at the receiving antenna leads to meter-level errors in code and cm-level errors on phase measurements.

GNSS code and carrier phase observations made on different frequency bands tend to have different multipath errors. Therefore, the impact of multipath errors on position estimates can be suppressed by taking the weighted average of multi-frequency GNSS code and phase observations.

A GNSS antenna is used to receive (sense) the signals sent by satellites. The received signals are inherently weak and often suffer from external interference and multipath effects. Therefore it is important that the antenna design addresses the intrinsic nature of GNSS signals.

In an embodiment of the present technology, FIG. 7 is a diagram 160 that purports to show a relationship between antenna phase centers 162 and 164 and a mechanical center 166 of the patch antenna.

The antenna phase center, or electrical center, is the point in space where the signals are effectively measured to. When the electrical center of the antenna does not vary significantly with elevation angle or azimuth, the antenna is said to have a stable phase center. Some antenna phase center variation at mm-level is normal, even for the highest quality geodetic systems.

Antenna calibration is used to help remove the elevation dependent errors in high-precision antenna systems. The manufacture of each antenna should be consistent in order to make antenna calibration practical.

Table 1 presents an example of an US National Geodetic Survey (NGS) absolute antenna model for a Trimble SPS 985 system. Note that the model is given in terms of east/north/up offsets and an elevation-dependent component for L1 and L2 bands.

TABLE 1

NGS Absolute Antenna Model for Trimble TRMBSPS985 system.

| Band | North | East | Up [mm] |
|---|---|---|---|
| L1 Phase | 1.4 | 0.1 | 123.5 |
| L2 Phase | 1.6 | 0.3 | 113.4 |

| Elevation [degrees] | L1 Phase Offset at Elevation [mm] | L2 Phase Offset at Elevation [mm] |
|---|---|---|
| 90 | 0.0 | 0.0 |
| 85 | 0.2 | −0.1 |
| 80 | 0.5 | −0.3 |
| 75 | 0.9 | −0.5 |
| 70 | 0.9 | −0.3 |
| 65 | 0.6 | 0.0 |
| 60 | 0.0 | 0.3 |
| 55 | −0.7 | 0.3 |
| 50 | −1.2 | −0.2 |
| 45 | −1.3 | −0.9 |
| 40 | −1.0 | −1.3 |
| 35 | −0.4 | −1.0 |
| 30 | 0.0 | 0.2 |
| 25 | 0.3 | 1.7 |
| 20 | 0.2 | 2.5 |
| 15 | 0.3 | 2.0 |
| 10 | 0.6 | −0.2 |
| 5 | 1.6 | −2.8 |
| 0 | 3.1 | −3.6 |

In kinematic applications, the antenna is generally assumed to be maintained in roughly a horizontal orientation, with the bore sight axis vertical.

Some Trimble machine control systems measure and adjust for the true tilt of the antenna in the antenna calibration correction process.

Rather than following the conventional approach of pushing all frequency bands to a common electrical center, the antenna design can be greatly simplified by intentionally separating the different frequency band elements. This approach can be referred to as horizontally separated multiband elements, which emphasizes the fact that the elements are intentionally not vertically coaxial.

In an embodiment of the present technology, FIG. 7 illustrates a diagram 160 illustrating the relationship between antenna phase centers 162, 164 and the mechanical center 166 of a stacked patch antenna.

However, there is a vast array of applications that require heading information. For example, for automotive applications, it is important to know location and direction of travel.

The Trimble R 10 survey system includes a flux-gate compass and tilt sensors to measure the 3D orientation of the antenna pole. Consumer products such as smartphones also use flux-gate compasses to present directional information to the user.

But, flux-gate compasses are inherently inaccurate and are susceptible to localized magnetic disturbance caused by metallic objects and electric fields.

Inertial positioning systems benefit from accurate heading information to help bootstrap the initial IMU orientation and therefore often include dual-antenna GNSS systems. Dual-antenna systems are used in many Trimble-Caterpillar machine control systems mounted on graders, excavators and bulldozers.

Referring still to FIG. 1, the heading accuracy of the horizontally separated multi-band antenna is directly related to the separation (d) 17 of the antenna elements. To improve the angular heading determination it is important to separate the antenna elements 12 and 14 as far as possible.

In an embodiment of the present technology, FIG. 8 shows the horizontally separated multi-band dual antenna system 180 including the first multi-band antenna 188 horizontally separated from the second multi-band antenna 190. The first multi-band antenna 188 includes the first (band-1) phase center 182, whereas the second multi-band antenna 1890 includes the second (band-2) phase center 184. The mechanical center of the horizontally separated multi-band antenna system 180 is located in the point 186.

In an embodiment of the present technology, the horizontally separated multi-band antenna model 180 (of FIG. 8) of the multi-band antenna system (10 of FIG. 1) offers a way of estimating heading as well as producing multi-frequency measurements. It can benefit all applications that require heading information.

Assuming that the location of each frequency band element can be measured with an instantaneous standard deviation of the position ($\sigma^2_{position}$), the variance of the heading determination will be:

$$\sigma_{heading}^2 = 4\sigma_{position}^2/d^2 \qquad (7)$$

In practice, the heading determination from the multi-band elements can be integrated with inertial sensors and/or flux-gate compass sensors. True north headings determined from a horizontally separated multi-band antenna system will be unambiguous, but noisy, while flux-gate compass and inertial sensors are biased, but can help to average out noise.

Observation equations are developed below for estimating the heading and tilt of the antenna system using multi-band GNSS observations.

From an antenna design standpoint, the separation of band-1 and band-2 elements d (17 of FIG. 1) is dependent on the respective signal wavelengths and the dielectric substrate. Sufficient separation is needed to ensure that there isn't cross-coupling between the elements. There is an advantage in minimizing the element spacing d, from an antenna correction standpoint.

However, if the elements are spread apart, this increases the angular heading accuracy with which the antenna can be measured. It is also advantageous to limit the element separation d to less than 1 wavelength in order to ensure that the carrier phase ambiguities determined for a combined band-1/band-2 measurements, are the same for the separated band-1 and band-2 elements.

For surveying and geodetic applications where millimeter-level accuracy is required, it is desirable to minimize the separation distance d. Preferably d should be a few centimeters or less in this case.

The physical packaging of the antenna is also a constraint for human-transported applications such as hand-held positioning devices such as smart phones or survey equipment. Therefore d will often need to conform to the physical package size of the device on which the antenna elements are mounted.

GNSS survey equipment antennas are normally between 10 and 40 cm in diameter; smart phones have dimensions (5×15) cm. The angular heading accuracy is therefore limited when d is small.

Based on Eq. (7) and assuming σ=1 cm, and d=10 cm, the instantaneous heading accuracy is approximately 11 degrees.

The Trimble R 10 survey product currently uses a flux-gate compass, paired with tilt sensors, to adjust GNSS position estimates from the top-of-antenna-pole, to the base-of-antenna-pole measurement point. Rather than forcing the user to hold the antenna pole vertically, the R 10 system enables faster measurement by allowing the instrument to be held inclined to the vertical. The heading of the antenna should be known for the antenna tilt compensation. Unfortunately, flux-gate compasses are sensitive to local magnetic variation caused by metallic objects, electric fields etc. Having a GNSS-determined heading measurement would greatly enhance the antenna tilt compensation process. In this case, the antenna separation distance d, would need to be set with antenna size and heading accuracy in mind.

When heading determination is of primary importance, d should be maximized within the physical constraints of the mounting platform/package.

For example, on an earth moving machine, setting d at 1 m, would lead to an instantaneous heading accuracy of approximately ~1 degree=$[(180/(\pi)\sqrt{(4(0.01)^2/(1)^2)}]$.

For ship docking/navigation, heading is particularly important. It would be desirable in this case to set d as large as possible therefore the separate band elements could be separately housed. The separation distance, d, could be set equal to say 10 m or more. On long antenna runs, a signal preamplifier may be needed to compensate for cable/connector signal loss.

For high precision GNSS applications, carrier phase and code measurements from multiple bands are often used to form linear combinations with particular characteristics. For example, L1 and L2 GPS phase measurements are used to form an iono-free combination—which is largely free of ionospheric bias. This combination is particularly useful for long baseline estimation in which ionospheric bias is a significant error source. The wide-lane phase combination is used to help resolve carrier phase ambiguities. It has an effective wavelength of 86 cm roughly 4.5 times that of L1 phase.

Linear combinations of GNSS phase data can be generally described by:

$$\phi_c = \alpha\phi_1 + \beta\phi_2 \qquad (8)$$

Where the band-1 and band-2 phase measurements are given by the following models:

$$\phi_1 \lambda_1 = -R - I/f_1^2 - \tau + c(t - T^s) + N_1 + \epsilon_1 \qquad (9)$$

$$\phi_2 \lambda_2 = -R - I/f_2^2 - \tau + c(t - T^s) + N_2 + \epsilon_2 \qquad (10)$$

With:
$\phi_1$ band-1 phase measurement (cycles),
$\lambda_1$ band-1 wavelength (meters),
R– geometric distance from user to satellite:

$$R = \sqrt{(X-x)^2 + (Y-y)^2 + (Z-z)^2} \qquad (11)$$

$f_1$ frequency of band-1 (Hertz),
$\tau$ tropospheric delay (meters),
t receiver clock error (seconds),
$T^s$ satellite clock error (seconds),
c speed of light (meters/second),
$N_1$ band-1 integer carrier phase ambiguity (meters),
$\epsilon_1$ band-1 measurement noise (meters),
with corresponding definitions for the band-2 model.

Multi-band code measurements can also be combined to form a variety of linear combinations of the form:

$$r_c = ar_1 + br_2 \qquad (12)$$

Where the band-1 and band-2 code measurements are given by the following models:

$$r_1 = R - I/f_1^2 + \tau + c(t - T^s) + e_1 \qquad (13)$$

$$r_2 = R - I/f_2^2 + \tau + c(t - T^s) + e_2 \qquad (14)$$

The phase and code models described in Equations (8) to (14) above, assume that measurements are referenced to a common user position in space (x,y,z). Normally an antenna model is used to adjust the measurements to the reference point of the antenna.

It is important to emphasize that the antenna reference point of model 180 of FIG. 8 could be specified as the band-1 element phase center 182 (scenario 1); or as the band-2 element phase center 184 (scenario 2); or some other well-defined physical point, for example, the mechanical center 186 (scenario 3).

The generalized phase and code models below are applicable to any of the above given scenarios (1, 2 or 3) and reflect the general observation that there is an offset between the user position and the respective antenna element location:

$$\phi_1 \lambda_1 = -R_1 - I/f_1^2 - \tau + c(t - T^s) + N_1 + \epsilon_1 \qquad (15)$$

$$\phi_2 \lambda_2 = -R_2 - I/f_2^2 - \tau + c(t - T^s) + N_2 + \epsilon_2 \qquad (16)$$

$$r_1 = R_1 - I/f_1^2 + \tau + c(t - T^s) + e_1 \qquad (17)$$

$$r_2 = R_2 - I/f_2^2 + \tau + c(t - T^s) + e_2 \qquad (18)$$

where the modified range terms (R) contain antenna offset components according to:

$$R_1 = R - \left[\frac{(X-x)}{R}\right](x_1 - x) - \left[\frac{(Y-Y)}{R}\right](y_1 - y) - \left[\frac{(Z-z)}{R}\right](z_1 - z) \qquad (19)$$

$$R_2 = R - \left[\frac{(X-x)}{R}\right](x_2 - x) - \left[\frac{(Y-Y)}{R}\right](y_2 - y) - \left[\frac{(Z-z)}{R}\right](z_2 - z) \qquad (20)$$

With:
$(x_1, y_1, z_1)$ the 3D Cartesian coordinates of the band-1 phase center, and
$(x_2, y_2, z_2)$ the 3D Cartesian coordinates of the band-2 phase center.

The coefficients of the antenna coordinate offset terms $(x_i - x, y_i - y, z_i - z)$, are direction cosines for the user-satellite vector.

In RTK and RTX (Real Time eXtended) processing, we make use of a variety of linear combinations of code and phase measurements, including: iono-free phase, wide-lane phase, ionospheric-phase, narrow-lane code, band-1-code, band-2-code, and iono-free code.

In an embodiment of the present technology, given the measurements models above, it is possible to solve for the band-1 and band-2 phase center coordinates $(x_1, y_1, z_1)$ and $(x_2, y_2, z_2)$ directly by including all 6 coordinate terms in the estimation process.

In an embodiment of the present technology, alternatively, one could proceed with estimation of the location of the user coordinates (x, y, z) without explicitly modelling the antenna offset errors. It is sufficient to accept that the coordinates computed would correspond to the location defined by the geometric phase combination being used. In the case of RTX (Real Time eXtended) processing, this would be the phase-center corresponding to the iono-free phase combination. Interestingly, for the iono-free phase combination, the estimated user position will generally lie outside the band-1 and band-2 phase centers.

In an embodiment of the present technology, once the band-1 and band-2 ambiguities are known, any linear combination of phase can be formed without ambiguity, assuming that the antenna phase centers are located within 1 cycle of one another. The location of the band-1(band-2) antenna element can be estimated using the band-1(band-2)-only phase data, as presented below.

Starting with the ionospheric phase combination:

$$\phi_{iono} = \lambda_1 \phi_1 - \lambda_2 \phi_2 \qquad (21)$$

many systematic errors cancel in the formation of the ionospheric-phase combination, leading to the following simplified model:

$$\varphi_{iono} = -(R_1 - R_2) - I\left(\frac{f_2^2 - f_1^2}{f_1^2 f_2^2}\right) + N_1 - N_2 + \varepsilon_{iono} \qquad (22)$$

Expanding out the range terms, containing the antenna phase center locations, leads to:

$$\varphi_{iono} = \qquad (23)$$
$$-\left[\frac{(X-x)}{R}\right](x_1 - x_2) - \left[\frac{(Y-y)}{R}\right](y_1 - y_2) - \left[\frac{(Z-z)}{R}\right](z_1 - z_2) -$$
$$I\left(\frac{f_2^2 - f_1^2}{f_1^2 f_2^2}\right) + N_{iono} + \varepsilon_{iono}$$

Typically the distance d between antennas elements are accurately known. So rather than solving for the antenna element coordinates, the 3D orientation of the antenna system can be estimated directly in terms of: κ=heading, measured positive clockwise from true north, in the local horizon plane; δ=elevation angle, measured positive (negative) above (below) the local horizon plane.

FIG. 9 depicts coordinate geometry 180 for antenna tilt and heading in the (x, y, z) frame 192, and in the (East 201, North 196, and Up 194) or (e, n, u) frame.

More specifically, FIG. 9 illustrates the relationship between earth-centered, earth fixed (ECEF), x,y,z Cartesian coordinates, and a local-horizon plane (e,n,u) coordinate system. These two coordinate systems are related via a 3D transformation:

$$\begin{bmatrix} e \\ n \\ u \end{bmatrix} = \begin{bmatrix} -\sin\gamma & \cos\gamma & 0 \\ -\sin\varphi\cos\gamma & -\sin\varphi\sin\gamma & \cos\varphi \\ \cos\varphi\cos\gamma & \cos\varphi\sin\gamma & \sin\varphi \end{bmatrix} \begin{bmatrix} x \\ y \\ z \end{bmatrix} + \begin{bmatrix} \Delta e \\ \Delta n \\ \Delta u \end{bmatrix} \quad (24)$$

with φ=latitude, and γ=longitude of the user at position (x, y, z).

The ionospheric-phase equation (23), can be written in terms of the local horizon plane coordinate system as:

$$\varphi_{iono} = -\left[\frac{E}{R}\right](d\cos\delta\cos\kappa) - \left[\frac{N}{R}\right](d\cos\delta\sin\kappa) - \left[\frac{U}{R}\right](d\sin\delta) - I\left(\frac{f_2^2 - f_1^2}{f_1^2 f_2^2}\right) + N_{iono} + \varepsilon_{iono} \quad (25)$$

where E,N,U is the satellite coordinates relative to the local horizon system centered at the band-1 phase center.

The parameters of interest on the RHS of Equation (25) include the antenna heading (κ) 202 (of FIG. 9) and the antenna tilt (δ) 200 (of FIG. 9).

The ionospheric bias (I), is a nuisance parameter which can be modelled as a first-order Gauss-Markov process, with a long correlation time. The ambiguity term $N_{iono}$ is assumed known and the measurement error term $\epsilon_{iono}$ contains random and un modelled errors. In practice, a phase multipath term is also estimated as a nuisance parameter. Theoretically, only 2 satellites are needed to estimate the antenna heading and tilt. In practice, as many satellite measurements as possible are used over time to produce over determined estimates of the unknowns.

The antenna heading/tilt estimation process presented above, may also be applied to single-receiver situations. In this case, the ambiguity parameters $N_{iono}$, for each satellite, should be included in the estimation process.

Horizontally separated multi-band antenna systems have the potential to reduce the cost of manufacture of GNSS equipment. Importantly, they are particularly useful for consumer-grade/mass-market applications, where positional accuracy isn't paramount. Furthermore, horizontally separated multi-band antenna system enable heading of the device to be determined unambiguously, albeit with relatively poor angular accuracy. Heading accuracy could be further improved by integrating results with flux-gate compass and/or inertial sensors.

The separation of the antennas can be quite close, limited by the near field interaction of the antennas. One could use any of the techniques common to patch antennas (dielectric, bandwidth, feeds, and parasitic elements, ground plane treatments) to optimize any number of parameters (size, height, multipath, etc.).

In an embodiment of the present technology, the first multiband antenna (12 of FIG. 1) is positioned forward on a car body (not shown); wherein the second multiband antenna (14 of FIG. 1) is positioned backward on the car body (not shown). In this embodiment of the present technology, the position of the first multiband antenna relative to the position of the second multiband antenna in ECEF frame can be determined with a high accuracy.

In an embodiment of the present technology, the first multiband antenna (12 of FIG. 1) is positioned forward on a left part of a car body (not shown); wherein the second multiband antenna (14 of FIG. 1) is positioned backward on a right part of the car body (not shown). In this embodiment of the present technology, the position location of the first multiband antenna relative to the position location of the second multiband antenna in Earth Centred Earth Fixed (ECEF) frame can be determined with a high accuracy.

In an embodiment of the present technology, the first multiband antenna (12 of FIG. 1) is positioned on a first wing of an Unmanned Aerial Vehicle (not shown), wherein the second multiband antenna (14 of FIG. 1) is positioned on a second wing of the Unmanned Aerial Vehicle (not shown).

In an embodiment of the present technology, FIG. 10A is a front view 210 of a multiband antenna apparatus for high-precision GNSS positioning used for smart phone 216 applications including the first multiband antenna 212, and the second multiband antenna 214.

For example, the antenna 212 (of FIG. 10A) is configured to receive the L1 GPS signals, whereas the antenna 214 (of FIG. 10A) is configured to receive the L1 or L2C GPS signals. Those two antennas are separated by distance D (not shown) that can be in the range determined by the half-wavelengths for L1, or L2, or any distance in between L1 and L2, that is D is in the range of [19/2, 24/2] cm.

In an embodiment of the present technology, FIG. 10B shows a side view 220 of the multiband antenna apparatus. The two GNSS antenna/receiver packages may be rotated to achieve an optimum GNSS signals reception, as shown in two tilt positions 222 and 224.

In an embodiment of the present technology, the tilt angle of rotation (not shown) are adjustable over a small range. For example, one can use a detent-stop rotation system with 10 degree increments over a 40-50 degree range.

In an embodiment of the present technology, the entire antenna bar 222 could be rotatable in a different mounting system, so the antenna/receivers are always fixed to the bar.

In an embodiment of the present technology, FIG. 10C is an illustration 240 of a clip-on mounting system 242 for the multiband antenna apparatus 244 used for high-precision GNSS smart phone applications. The antenna bar 244 is attached first at the top of the smartphone (216 of FIG. 10A), and the bottom of the vertical element is snapped into place on the bottom.

In an embodiment of the present technology, the mounting system 244 of FIG. 10C may be of any kind: a case that is already part of the bar 244 that the smartphone (216 of FIG. 10A) is snapped into, or a mounting screw (not shown) on a smartphone case that screws into the vertical mounting bar.

The surface wave propagation is a major problem with micro strip antenna which leads to worse performance of the antenna and even for arrays. The excitation of surface waves instigates mutual coupling between the adjacent elements of an antenna array and it turn into worse at higher operating frequencies with increasing substrate permittivities and thicknesses.

In an embodiment of the present technology, the first phase center (24 of FIG. 1) of the first multiband antenna (12 of FIG. 12) is separated from the second phase center (22 of FIG. 1) of the second multiband antenna (14 of FIG. 12) in a horizontal plane by an optimum horizontal separation distance, wherein the optimum horizontal separation distance depends on the dielectric properties of the substrate, and wherein the optimum horizontal separation distance corresponds to the band gap of the surface electromagnetic waves. In this embodiment of the present technology, the coupling of the first antenna and the second antenna is minimized.

In an embodiment of the present technology, the first phase center (24 of FIG. 1) of the first multiband antenna (12 of FIG. 12) is separated from the second phase center (22 of FIG. 1) of the second multiband antenna (14 of FIG. 12) in a horizontal plane by a maximized horizontal separation distance (not shown). In this embodiment of the present technology, the multiband antenna apparatus (10 of FIG. 1) is configured for an optimum angular heading determination.

In an embodiment of the present technology, the first phase center (24 of FIG. 1) of the first multiband antenna (12 of FIG. 12) is separated from the second phase center (22 of FIG. 1) of the second multiband antenna (14 of FIG. 12) in a horizontal plane by a minimized horizontal separation distance (not shown). In this embodiment of the present technology, the multiband antenna apparatus (10 of FIG. 1) is configured for high accuracy applications.

In an embodiment of the present technology, the method of operating of the multiband antenna apparatus (10 of FIG. 1) comprises the step (not shown) (A) of using the first multiband antenna (12 of FIG. 1) for reception of GNSS signals in the first multiband (band-1) of the electromagnetic spectrum, whereas the first multiband antenna 12 includes the first phase center 24 configured to represent a first phase data collected by the first multiband antenna 12 in the first multiband (band-1) of the electromagnetic spectrum.

In an embodiment of the present technology, at the next step (not shown), the method of operating of the multiband antenna apparatus (10 of FIG. 1) comprises the step (B) of using the second multiband antenna (14 of FIG. 1) for reception of GNSS signals in the second multiband (band-2) of the electromagnetic spectrum, whereas the second multiband antenna 14 includes the second phase center 22 configured to represent a second phase data collected by the second multiband antenna 14 in the second multiband (band-2) of the electromagnetic spectrum.

In an embodiment of the present technology, at the next step (not shown), the method of operating of the multiband antenna apparatus (10 of FIG. 1) comprises the step (C) of separating the first phase center (24 of FIG. 1) multiband antenna (12 of FIG. 1) from the second phase center (22 of FIG. 1) of the second multiband antenna (12 of FIG. 1) by a separation distance d (17 of FIG. 1). As was discussed above, a minimized horizontal separation distance d can be used for high accuracy applications. On the other hand, a maximized horizontal separation distance d can be used for an optimum angular heading determination.

In an embodiment of the present technology, finally, the method of operating of the multiband antenna apparatus (10 of FIG. 1) comprises the step (D (not shown) of using the antenna phase reference point 16 to represent an integrated electric phase data by integrating the first phase data collected by the first multiband antenna 12 in the first (band-1) multiband of the electromagnetic spectrum and by integrating the second phase data collected by the second multiband antenna 14 in the second (band-2) multiband of the electromagnetic spectrum.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A multiband antenna apparatus for high-precision GNSS positioning comprising:

a first multiband antenna element coupled to the multiband antenna apparatus, the first multiband antenna element configured for reception of GNSS signals in a first multiband of electromagnetic spectrum; said first multiband antenna element having a first phase center configured to represent a first phase data collected by said first multiband antenna element in said first multiband of electromagnetic spectrum;

a second multiband antenna element coupled to the multiband antenna apparatus, the second multiband antenna element configured for reception of GNSS signals in a second multiband of electromagnetic spectrum; said second multiband antenna element having a second phase center configured to represent a second phase data collected by said second multiband antenna element in said second multiband of electromagnetic spectrum; wherein said first multiband antenna element is laterally spaced from said second multiband antenna element on the multiband antenna apparatus by a separation distance, the separation distance being within a range of between one half wavelength of the GNSS signals in the first multiband of electromagnetic spectrum and one half wavelength of the GNSS signals in the second multiband of electromagnetic spectrum; and an antenna phase reference point; wherein said antenna phase reference point is configured to represent an integrated phase data by integrating said first phase data collected by said first multiband antenna element in said first multiband of electromagnetic spectrum and by integrating said second phase data collected by said second multiband antenna element in said second multiband of electromagnetic spectrum; wherein said antenna phase reference point is related to a physical reference point of said multiband antenna apparatus.

2. The apparatus of claim 1, wherein said first multiband of electromagnetic spectrum is selected from the group consisting of: an EL1 frequency band; an EL2 frequency band; and a GNSS satellite frequency band.

3. The apparatus of claim 1, wherein said second multi band of electromagnetic spectrum is selected from the group consisting of: an EL1 frequency band; an EL2 frequency band; and a GNSS satellite frequency band.

4. The apparatus of claim 1, wherein said first multiband antenna element is selected from the group consisting of: a patch antenna; and a helical antenna; and a cross dipole antenna.

5. The apparatus of claim 4, wherein said first multiband patch antenna is selected from the group consisting of:
a rectangular metal patch antenna; a square metal patch antenna;
a circle metal patch antenna; and a triangle metal patch antenna.

6. The apparatus of claim 4, wherein said first multiband patch antenna further comprises:
a patch antenna located above a ground plane with a dielectric material therebetween.

7. The apparatus of claim 4, wherein said first multiband patch antenna further comprises:
a patch antenna having a size of a resonance wavelength corresponding to a half of a dielectrically compensated wavelength at a center frequency of said first multiband.

8. The apparatus of claim 4, wherein said first multiband patch antenna element further comprises:
a patch antenna being excited through a feeding method selected from the group consisting of:
a micro strip feeding method; a probe feeding method; and an aperture coupled feeding method.

9. The apparatus of claim 1, wherein said second multi band antenna element is selected from the group consisting of: a patch antenna; a cross dipole antenna; and a helical antenna.

10. The apparatus of claim 9, wherein said second multi band patch antenna is selected from the group consisting of:
a rectangular metal patch antenna; a square metal patch antenna;
a circle metal patch antenna; and a triangle metal patch antenna.

11. The apparatus of claim 9, wherein said second multiband patch antenna further comprises:
a patch antenna located above a ground plane with a dielectric material therebetween.

12. The apparatus of claim 9, wherein said second multiband patch antenna further comprises:
a patch antenna having a size of a resonance wavelength corresponding to a half of a dielectrically compensated wavelength at a center frequency of said first multiband.

13. The apparatus of claim 9, wherein said second multi band patch antenna element further comprises:
a patch antenna being excited through a feeding method selected from the group consisting of:
a micro strip feeding method; a probe feeding method; and an aperture coupled feeding method.

14. The apparatus of claim 1, wherein said first multiband antenna element further comprises:
a right-hand circular polarized first multiband antenna.

15. The apparatus of claim 14, wherein said first right-hand circular polarized multiband antenna is selected from the group consisting of:
a single probe fed rectangular patch antenna; a two probe fed square patch antenna; and a four probe fed square patch antenna.

16. The apparatus of claim 1, wherein said second multiband antenna element further comprises:
a right-hand circular polarized first multiband antenna.

17. The apparatus of claim 16, wherein said second right-hand circular polarized multiband antenna is selected from the group consisting of:
a single probe fed rectangular patch antenna; a two probe fed square patch antenna; and a four probe fed square patch antenna.

18. The apparatus of claim 1, wherein said first multiband antenna element is positioned forward on a car body; wherein said second multiband antenna element is positioned backward on said car body; wherein a position of said first multiband antenna element relative to a position of said second multiband antenna element in ECEF frame is determined with a high accuracy.

19. The apparatus of claim 1, wherein said first multi band antenna element is positioned on a left part of a car body; wherein said second multiband antenna element is positioned on a right side of said car body; and wherein a position location of said first multiband antenna element relative to a position location of said second multiband antenna element in ECEF frame is determined with a high accuracy.

20. The apparatus of claim 1, wherein said first multiband antenna element is positioned on a first wing of an Unmanned Aerial Vehicle; wherein said second multiband antenna element is positioned on a second wing of said Unmanned Aerial Vehicle.

21. The apparatus of claim 1, wherein said first multiband antenna element and said second multi band antenna element are mounted on a bar, and wherein said bar is attached to a mobile communication device by a clip-on mounting system; said mobile communication device is selected from the group consisting of: a smart phone; a cell phone; and a tablet.

22. The apparatus of claim 21, wherein said bar is rotated with respect to said mobile communication device to achieve an optimum GNSS signals reception.

23. A method of high-precision GNSS positioning by using an antenna apparatus comprising:
(A) receiving GNSS signals in a first multiband of electromagnetic spectrum by using a first multiband antenna element coupled to the multiband antenna apparatus; said first multiband antenna element having a first phase center configured to represent a first phase data collected by said first multiband antenna element in said first multiband of electromagnetic spectrum;
(B) receiving GNSS signals in a second multiband of electromagnetic spectrum by using a second multiband antenna element coupled to the multiband antenna apparatus; said second multiband antenna element having a second phase center configured to represent a second phase data collected by said second multiband antenna element in said second multiband of electromagnetic spectrum, wherein the first multiband antenna element is laterally spaced from the second multiband antenna element on the multiband antenna apparatus by a separation distance, the separation distance being within a range of between one half wavelength of the GNSS signals in the first multiband of electromagnetic spectrum and one half wavelength of the GNSS signals in the second multiband of electromagnetic spectrum; and (C) integrating said first phase data collected by said first multiband antenna element in said first multiband of electromagnetic spectrum and integrating said second phase data collected by said second multiband antenna element in said second multiband of electromagnetic spectrum by using an antenna phase reference point configured to represent an integrated phase data; wherein said antenna phase reference point is related to a physical reference point of said antenna apparatus.

\* \* \* \* \*